United States Patent
Albert

(10) Patent No.: US 6,369,541 B1
(45) Date of Patent: Apr. 9, 2002

(54) ROTARY POSITION SENSING DURING ROTOR ACCELERATION IN AN ELECTRIC MOTOR

(75) Inventor: Glenn Albert, Longmont, CO (US)

(73) Assignee: Maxtor Corporation, Longmont, CO (US)

(*) Notice: Subject to any disclaimer, the term of this patent is extended or adjusted under 35 U.S.C. 154(b) by 0 days.

(21) Appl. No.: 09/493,737

(22) Filed: Jan. 28, 2000

Related U.S. Application Data

(60) Provisional application No. 60/117,767, filed on Jan. 29, 1999.

(51) Int. Cl.[7] ............................. H02P 6/02; G11B 21/12
(52) U.S. Cl. ...................... 318/560; 318/561; 318/439; 360/75; 360/73.03
(58) Field of Search .................... 318/560–696, 318/439, 254, 138, 139, 245; 360/75, 78.04, 78.09, 70, 73.03, 71, 105

(56) References Cited

U.S. PATENT DOCUMENTS

| | | | |
|---|---|---|---|
| 5,028,852 A | 7/1991 | Dunfield | 318/254 |
| 5,254,914 A | 10/1993 | Dunfield et al. | 318/254 |
| 5,258,695 A | 11/1993 | Utenick et al. | 318/138 |
| 5,442,266 A | 8/1995 | Morehouse et al. | 318/272 |
| 5,466,997 A | 11/1995 | Utenick et al. | 318/254 |
| 5,495,368 A | * 2/1996 | Blatchley et al. | |
| 5,530,326 A | * 6/1996 | Galvin et al. | |
| 5,532,926 A | * 7/1996 | Dunn et al. | |
| 5,569,990 A | 10/1996 | Dunfield | 318/254 |
| 5,729,399 A | * 3/1998 | Albrecht et al. | |
| 5,821,713 A | * 10/1998 | Holling et al. | |
| 5,982,571 A | * 11/1999 | Calfee et al. | |
| 6,229,663 B1 | * 5/2001 | Yoneda et al. | |

* cited by examiner

Primary Examiner—Paul Ip
(74) Attorney, Agent, or Firm—Sheridan Ross P.C.

(57) ABSTRACT

A spin up procedure for use with a DC brushless motor uses a variable rotor position sampling interval during the early stages of rotor acceleration. Prior to applying a drive current to the motor, the present position of the rotor with respect to the stator is sensed. Once the initial rotor position is known, a selected drive current state is applied to the stator coil windings to initiate motion of the rotor. While the rotor accelerates, rotor position samples are repeatedly taken to provide the needed position feedback for commutation purposes. The rotor position samples are taken using a decreasing sampling interval during the rotor acceleration phase. Preferably, the rotor position update rate roughly tracks the increasing rotational velocity of the rotor during the spin up operation.

26 Claims, 23 Drawing Sheets

DETAIL I

ROTARY POSITION SENSING DURING ROTOR ACCELERATION IN AN ELECTRIC MOTOR

This application claims benefit of Provisional Application Ser. No. 60/117,767 filed Jan. 29, 1999, abandoned.

FIELD OF THE INVENTION

The invention relates generally to electric motors and, more particularly, to start procedures for use with electric motors.

BACKGROUND OF THE INVENTION

Many modern devices make use of direct current (DC) brushless motors to provide rotational movement within the device. For example, hard disk drives commonly use DC brushless motors as spindle motors to rotate a disk carrying hub about an axis of rotation. A DC brushless motor typically includes a movable rotor portion having permanent magnet structures disposed about a circumference thereof and a stationary stator portion having a plurality of coils wound thereon in fixed relation to one another. By properly driving the coils on the stator, the rotor portion is set in motion to revolve about an axis of rotation in a desired manner.

In a DC brushless motor, the specific motor coils that need to be energized at any particular time to support rotation of the rotor typically depend upon the present rotational position of the rotor with respect to the stator. Therefore, to efficiently power a DC brushless motor, it is usually necessary to track the position of the rotor with respect to the stator so that proper commutation of the motor coils can be achieved. Traditionally, back electromotive force (EMF) generated in the coils during rotation of the rotor has been used to provide rotor position feedback for use in determining the proper commutation points for the motor. However, back EMF is unreliable at low rotor rotation velocities, such as those that exist during motor spin up operations. Consequently, rotor position feedback has not traditionally been used during the early stages of rotor acceleration, thus making accurate commutation difficult and inefficient during spin up operations.

Therefore, there is a need for a method and apparatus for efficiently and accurately spinning up a DC brushless motor.

SUMMARY OF THE INVENTION

The present invention relates to a system and procedure for use in spinning up a DC brushless motor. During the early stages of the rotor acceleration process (i.e., the spin up period), the position of the rotor is repeatedly sampled for use in identifying the ideal commutation points of the motor. The sampling interval that is used to sample the rotor position is decreased as the rotor accelerates so that the position update rate roughly tracks the increasing angular velocity of the rotor. In a preferred embodiment, the sampling interval is changed based upon a changing commutation state of the motor. In alternative embodiments, the sampling interval is changed based upon the changing position or speed of the rotor or based upon elapsed time.

Because the rotor is moving more slowly at the beginning of the spin up process, the rotor position update rate that is required for accurate commutation during this time is lower. As the rotor begins to move faster, the position update rate is increased (i.e., the sampling interval is decreased) so that more accurate commutation can be achieved at the higher speeds. Eventually, the commutation function is preferably switched over to a conventional back EMF based position feedback approach. Because position sampling is less frequent at the start of the spin-up procedure, the relative amount of time that is dedicated to the application of drive current to the motor windings is larger at the beginning of the process. Maximizing the percentage of time that the drive current is applied while the rotor is stationary or moving slowly increases the motor's ability to overcome loading or friction problems (e.g., stiction events in disk drives) during spin up. Thus, a highly reliable and efficient spin up of the motor can be achieved.

DETAILED DESCRIPTION OF A PREFERRED EMBODIMENT

The present invention is related to a method and apparatus for efficiently and reliably spinning up an electric motor. The position of the rotor of the electric motor is repeatedly sampled during the early stages of the motor spin up process to provide the position feedback necessary to perform accurate commutation during this period. More importantly, the sampling interval that is used to sample the rotor position is decreased with time during rotor acceleration. Because the sampling interval is longer during the earliest portion of the spin up process, the percentage of time that spin current is being applied to the coils of the motor during this period is maximized. Thus, the motor is better able to overcome friction or loading problems during initialization of rotor motion. The principles of the present invention can be used in virtually any application that utilizes a DC brushless motor. The inventive principles are particularly beneficial in disk drive spindle motor applications.

Figure 1:
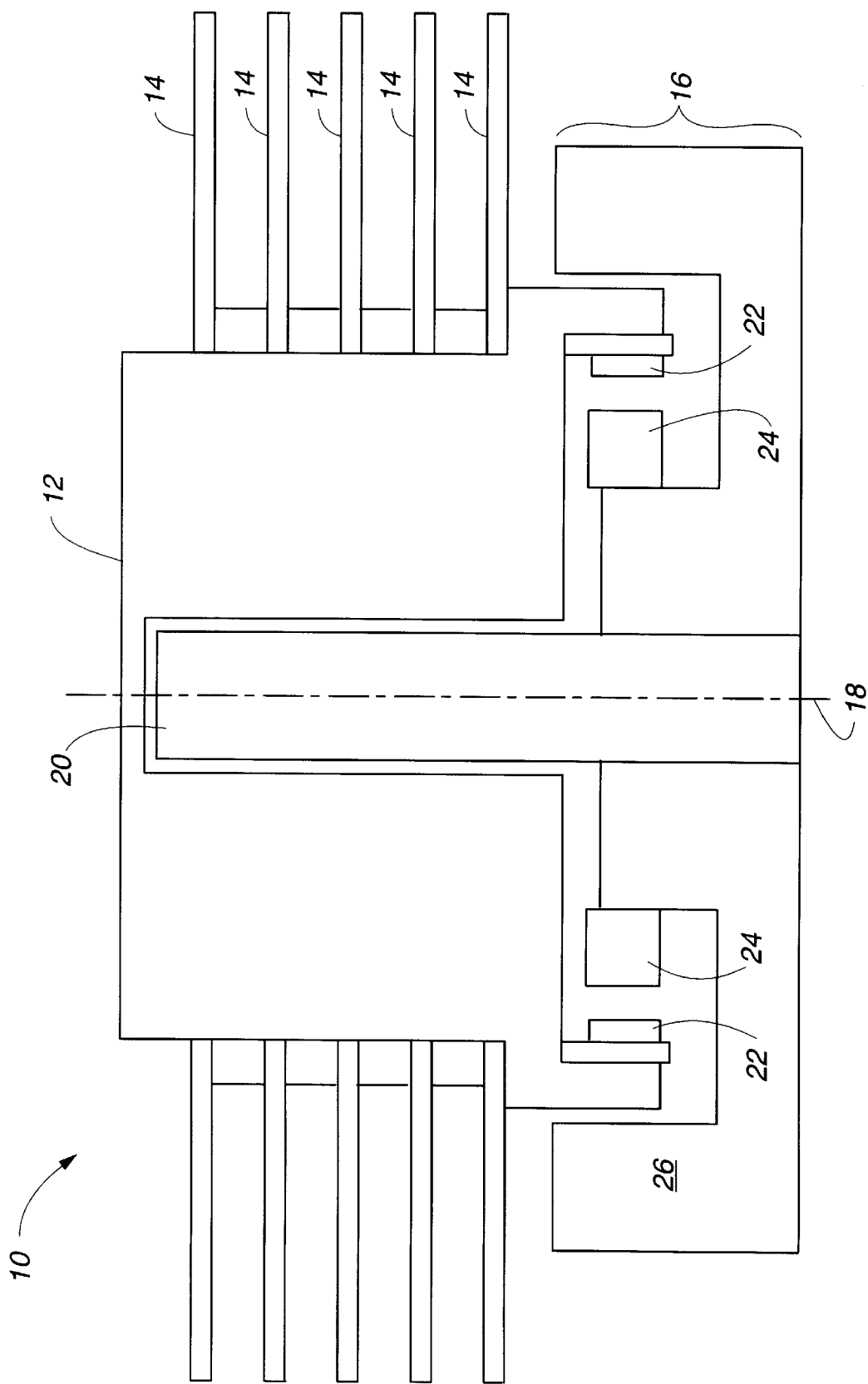
FIG. 1 is a sectional side view illustrating a disk drive that can utilize the principles of the present invention.

FIG. 1 is a simplified sectional side view of a disk drive 10 having a spindle motor 16 that can utilize the principles of the present invention. The disk drive 10 includes a hub 12 that carries a plurality of magnetic storage disks 14 that are used by the disk drive 10 to store digital user information. The hub 12 is rotatably coupled to a stationary spindle member 20 by some form of bearing structure (not shown) so that the hub 12 and the attached disks 14 are free to rotate about an axis of rotation 18. As the disks 14 rotate about the axis 18, data is read from and written to the disks 14 using transducer elements (not shown) that are held near the respective surfaces of the disks 14.

As illustrated in FIG. 1, the disk drive 10 also includes an integrated spindle motor 16 for imparting rotational motion to the hub 12 and disks 14 during disk drive operation. The spindle motor 16 includes a plurality of permanent magnet elements 22 disposed at angular intervals about an inner surface of the hub 12. In an alternative approach, instead of using a number of discrete permanent magnet pieces, a single ring of magnetic material having an alternating magnetic field orientation (e.g., north-south, south-north, north-south, etc.) in the circumferential direction of the inner hub surface is used. The spindle motor 16 also includes a number of coil windings 24 fixedly attached to a stationary base portion 26 of the disk drive 10 at angular intervals. The coil windings 24 are used to generate magnetic poles within the spindle motor 16 in response to application of drive currents to the windings 24 to initiate and maintain rotation of the motor 16. In conformity with standard motor terminology, the moving portion of the spindle motor 16 (which is integral with the hub 12 and the disks 14) will be referred to herein as the "rotor" and the stationery portion of the spindle motor 16 will be referred to as the "stator."

During disk drive operation, the coil windings 24 are energized in a predetermined sequence to generate a varying magnetic field within the motor 16. This varying magnetic field interacts with the magnetic fields generated by the permanent magnets 22 to impart rotational motion to the rotor. As can be appreciated, the timing with which the coils 24 are energized is very important for achieving optimal motor performance. That is, the coils 24 must be energized so that they create the proper magnetic field orientation at the proper times to facilitate rotation of the rotor. Thus, the rotational position of the rotor with respect to the stator needs to be tracked to determine how and when to energize the coils.

The process of varying the coil energization as the rotor spins about the axis 18 to facilitate rotation is known as "commutation" of the motor. A number of commutation "states" are generally defined to describe different coil drive arrangements that are desirably applied at different rotational positions of the rotor. During rotor rotation, the system repeatedly sequences through the commutation states based on the changing rotor position. To do this, the system must identify the ideal commutation points at which to "commutate" to a new state. Traditionally, the commutation points have been identified using the back EMF generated in the coil windings 24 during rotation. However, this back EMF does not exist when the rotor is stationary and is not reliable when the rotor is rotating at very low speeds. Therefore, back EMF cannot generally be relied upon during the early stages of a spindle motor spin up procedure.

Figure 2:
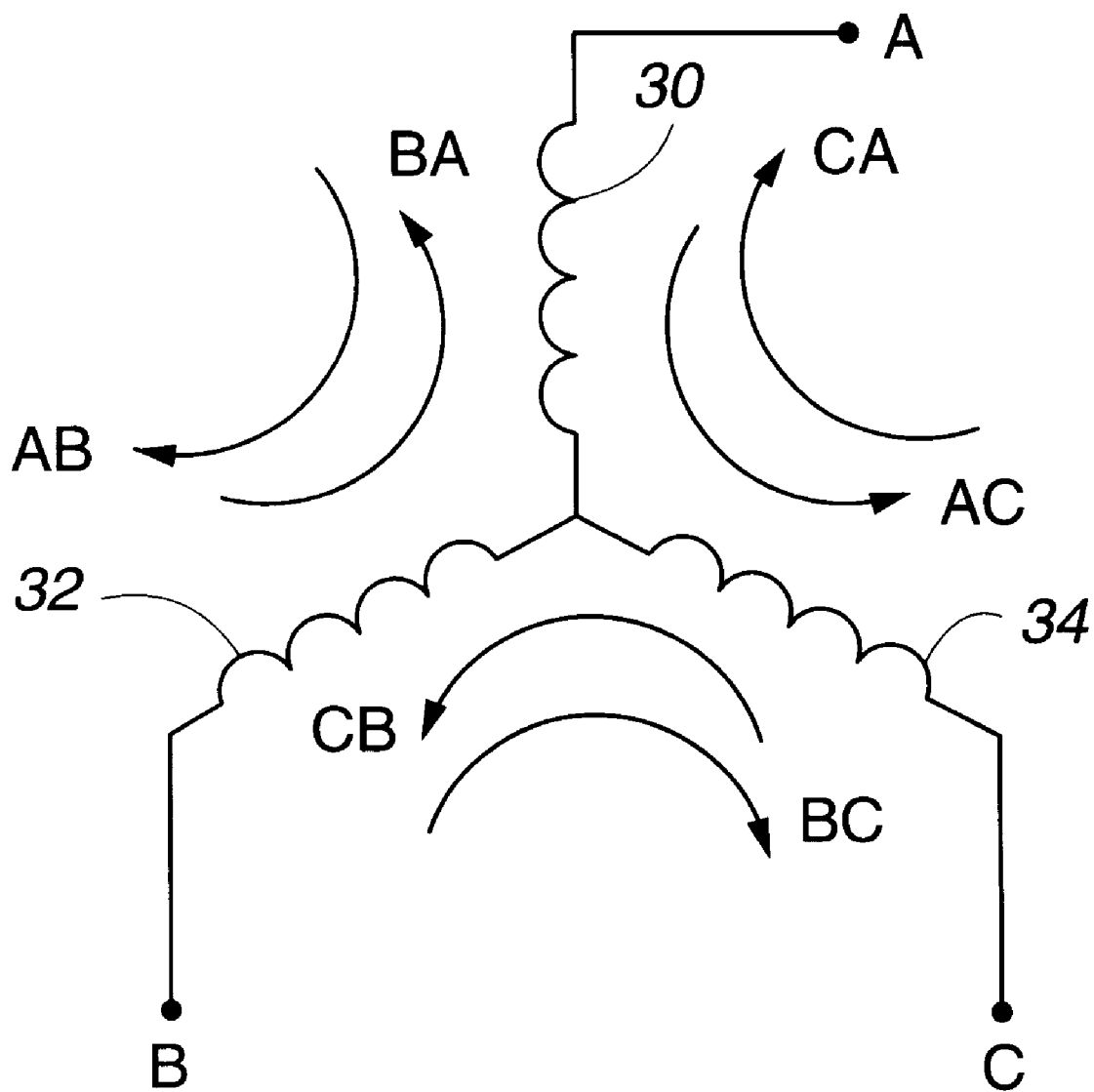
FIG. 2 is a schematic diagram illustrating a three-phase, wye connected stator winding that can be used in accordance with the present invention.

FIG. 2 is a schematic diagram illustrating a number of motor coils 30, 32, 34 connected in a three-phase wye arrangement 38. That is, the coils 30, 32, 34 are each connected at one end to a common node N and at another end to a respective terminal point A, B, C. The wye arrangement 38 is typically utilized in three-phase motors to connect the coils that are used to generate the varying magnetic fields which move the rotor. Other alternative coil arrangements can also be used. A single coil within the wye arrangement 38 (e.g., coil 30, 32, or 34 in FIG. 2) can be used to generate magnetic poles at a number of different circumferential positions about the stator portion of the motor and is not limited to providing a pole at a single location. Thus, a single three-phase motor can have greater than three coil-generated magnetic poles on the stator portion.

With reference to FIG. 2, there are typically six different electrical states within a three-phase, wye connected motor. In a first electrical state AB, a spin current flows from terminal A to terminal B through coils 30 and 32. In a second state BA, the same current flows in the opposite direction through coils 32 and 30. In a third state BC, a spin current flows from terminal B to terminal C through coils 32 and 34. In a fourth state CB, the same current flows in the opposite direction through coils 34 and 32. In a fifth electrical state CA, a spin current flows from terminal C to terminal A through coils 34 and 30. In a sixth and final state AC, the same current flows in the opposite direction through coils 30 and 34. During rotation of the rotor, the motor commutates between these different states in a predetermined sequence based on detection of predefined commutation points. As described above, during higher speed operation, these points are usually detected using the back EMF generated in the coils.

Figure 3:
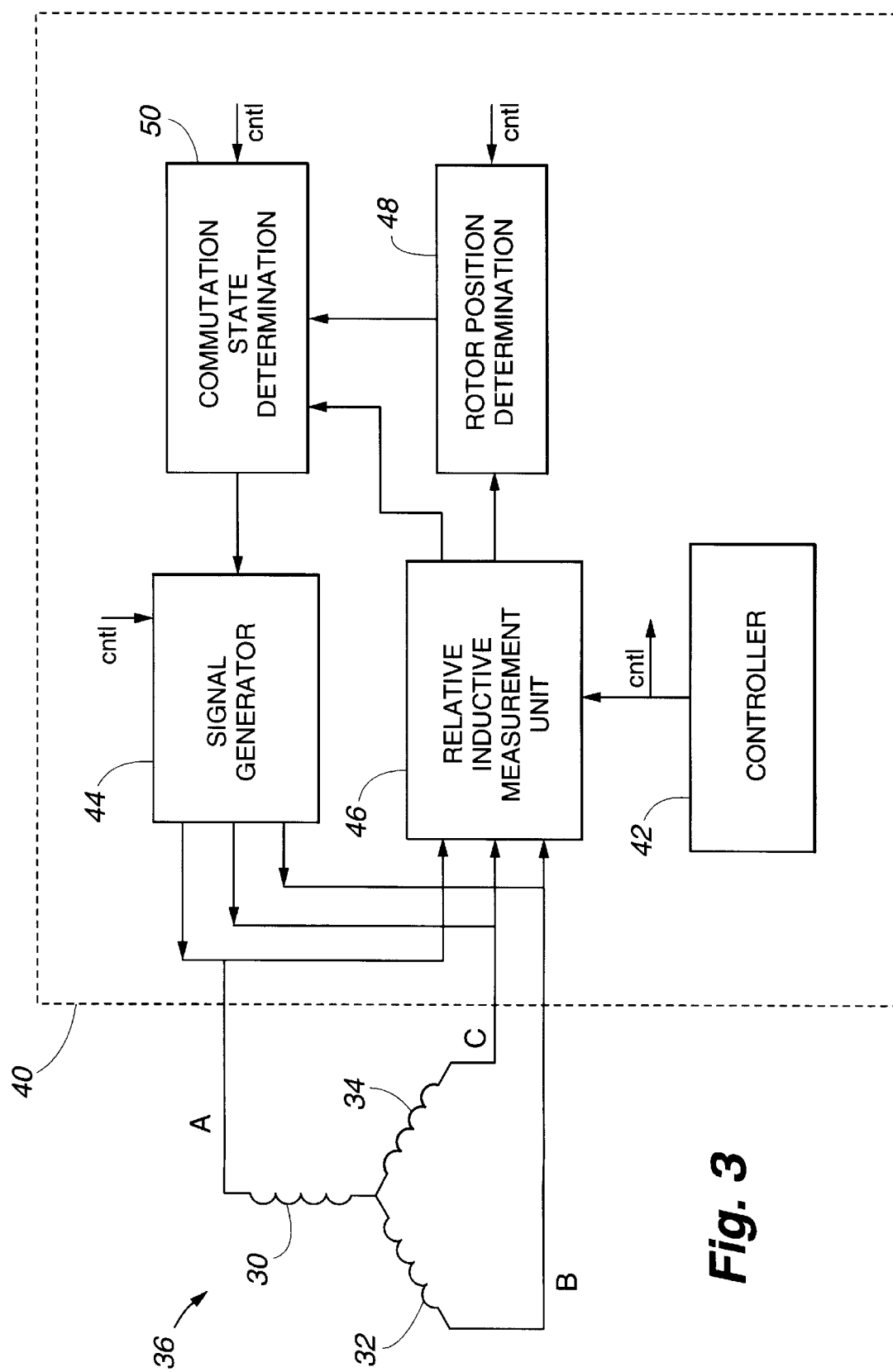
FIG. 3 is a block diagram illustrating a commutation control unit for use during a spin up procedure in accordance with one embodiment of the present invention.

FIG. 3 is a block diagram illustrating a commutation control unit 40 for use in performing a spin up procedure for a DC brushless motor in accordance with one embodiment of the present invention. As will be described in greater detail, the commutation control unit 40 repeatedly samples the rotor position of a corresponding motor using a sampling interval that decreases as the rotor accelerates. As illustrated, the commutation control unit 40 includes: a controller 42, a signal generator 44, a relative inductance measurement unit 46, a rotor position determination unit 48, and a commutation state determination unit 50. The relative inductance measurement unit 46 is coupled to each of the three coils 30, 32, 34 of a three-phase motor 36 for use in measuring a relative inductance of the motor windings. The relative inductance information generated by the relative inductance measurement unit 46 is then used by the rotor position determination unit 48 and the commutation state determination unit 50 to determine the preferred commutation state of the motor 36 (i.e., the state that will generate maximum torque). The preferred commutation state information is then delivered to the signal generator 44 which applies the appropriate drive current to the coils 30, 32, 34 of the motor 36 based thereon. When the commutation state determination unit 50 subsequently detects the occurrence of an ideal commutation point, it instructs the signal generator 44 to switch to a next electrical state within the predetermined sequence.

With reference to FIG. 3, it should be appreciated that the blocks comprising the commutation control unit 40 are functional in nature and do not necessarily represent discrete hardware elements. For example, in one embodiment, two or more of the functional blocks are implemented within a common digital processor. In a disk drive environment, the commutation control unit 40 can be implemented in software within the disk drive controller. Hardware implementations are also possible.

The controller 42 is operative for controlling the elements within the commutation control unit 40 to effect the spin up of the motor 36. The controller 42 first determines that a spin up procedure needs to be performed. In a disk drive embodiment, for example, a spin up procedure needs to be performed if a read or write operation has been requested while the hub is in an idle (non-moving) state. After a spin up determination has been made, the controller 42 determines a present position of the rotor before it attempts to initiate motion of the rotor. The controller 42 causes the signal generator 44 to apply signals (i.e., non-drive signals) to the motor windings to enable the relative inductance measurement unit 46 to measure a relative inductance corresponding to each of the six states of the motor 36. Preferably, the signals applied to the motor windings will be of short enough duration that no significant motion of the rotor is generated. Alternatively, for greater accuracy, the rotor position can be locked during initial position sensing. The relative inductance information measured by the relative inductance measurement unit 46 is transferred to the rotor position determination unit 48 which uses the information to determine the initial position of the rotor.

In a preferred approach, the relative inductance measurement unit 46 detects a value associated with the current risetime of each motor state to develop an indication of the relative inductance of the corresponding windings. For example, in one approach, the relative inductance measurement unit 46 measures the level to which a current has risen a fixed period of time (e.g., 150 microseconds) after the initial application of a signal to each state. This current level is used as a measure of the relative inductance of the windings for that state. As will be apparent to a person of ordinary skill in the art, other methods for determining the relative inductance of the motor windings can also be used.

Figure 4:
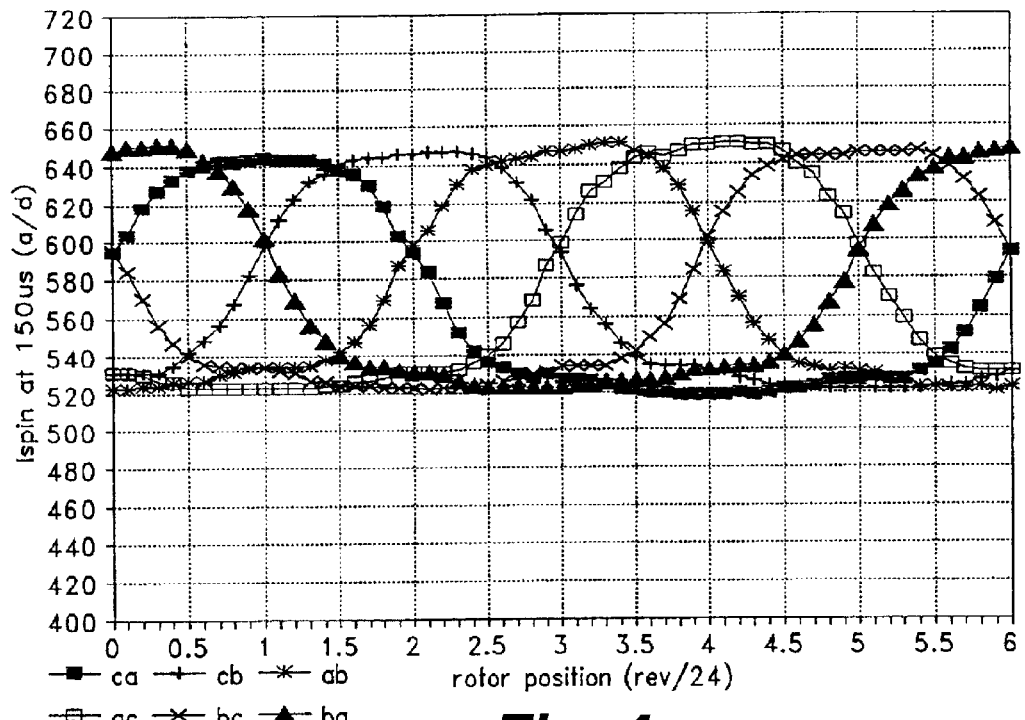
FIG. 4 is a graph illustrating a series of curves that each illustrate the relationship between relative inductance and rotor position for a corresponding motor state.

As described above, the relative inductance information determined by the relative inductance measurement unit 46 for the six motor states is transferred to the rotor position determination unit 48 which uses the information to determine the initial position of the rotor. The rotor position determination unit 48 compares the relative inductance values to one another to determine an initial rotor position for the motor 36. FIG. 4 is a graph illustrating a family of curves illustrating how relative inductance (i.e., the rise current at 150 microseconds in the illustrated embodiment) varies with rotor position for each motor state. Based on the information in FIG. 4, the rotor position determination unit 48 is able to determine the initial position of the rotor by comparing the measured relative inductance values. In one approach, for example, a logic table is generated using the information illustrated in the graph of FIG. 4 that indicates the present rotor position based on relative inductance magnitude relationships. First, the three highest magnitude relative inductance values are identified. Then, the magnitude relationships of the three values (i.e., greater then/less than) are determined. These relationships are then compared to the logic table to determine the present rotor position range. For example, if the three highest magnitudes correspond to states AB, CB, and AC and mag(AB)>mag(CB) >mag(AC) then the logic table would indicate a rotor position range between 2.5 and 3.0 rev/24. As will be described below, this range corresponds to a peak torque state of AC.

Figure 5:
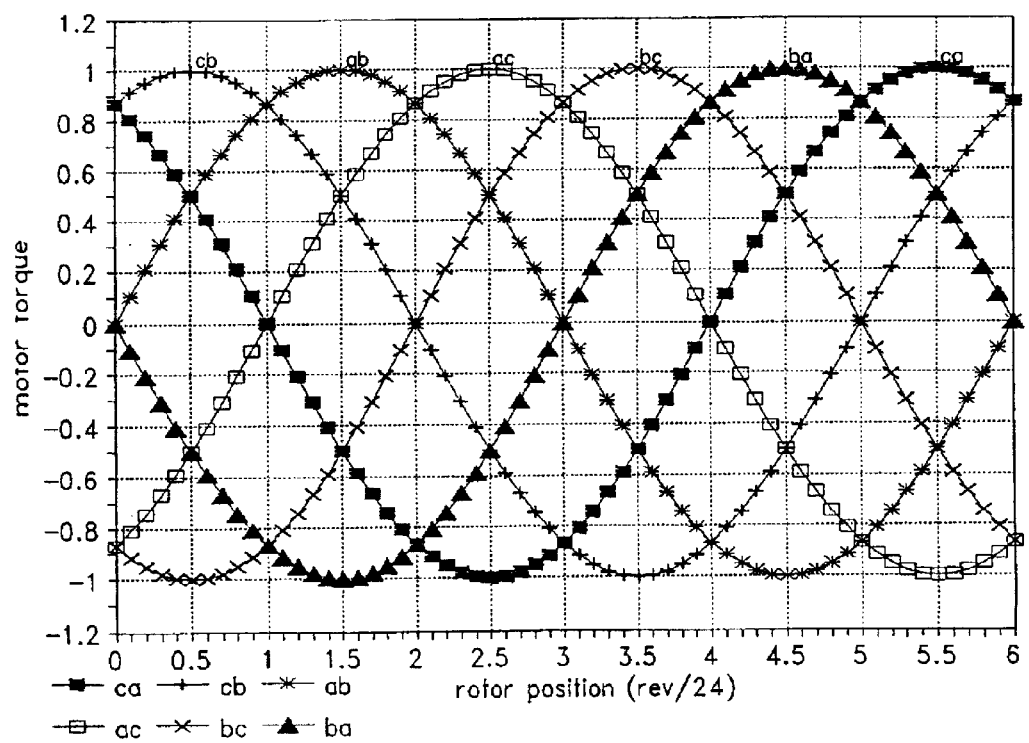
FIG. 5 is a graph illustrating a series of curves that each illustrate the relationship between motor torque and rotor position for a corresponding motor state.

The initial rotor position information is next transferred from the rotor position determination unit 48 to the commutation state determination unit 50 which compares the initial rotor position information with data stored therein to determine a preferred commutation state of the motor 36 that will generate a maximum amount of torque given the initial rotor position. FIG. 5 is a graph illustrating a family of curves illustrating how motor torque varies with rotor position for each of the motor states. It is generally desired that the maximum torque motor state always be used and thus the ideal commutation points are located at the points where the peaks of the curves in FIG. 5 transition from one to another (e.g., 1 rev/24 from state cb to state ab, 2 rev/24 from state ab to state ac, etc.). In one approach, the peak torque information from FIG. 5 is included in the previously discussed logic table and, therefore, a peak torque state is determined directly from the relative inductance analysis. Thus, the functions of the rotor position determination unit 48 and the commutation state determination unit 50 can be performed together. The commutation state determination unit 50 delivers the preferred commutation state information to the signal generator 44 which generates the drive currents corresponding to the identified state.

After the initial preferred commutation state has been determined and applied, the controller 42 performs a series of additional rotor position samples for use in detecting the occurrence of ideal commutation points in the motor. Unlike the initial rotor position sample, these additional rotor position samples can be performed by measuring a relative inductance corresponding to as little as one of the electrical states of the motor. In a preferred approach, the relative inductance of two of the six motor states is measured. Fewer samples are required because the controller 42 already knows the present preferred commutation state of the motor and, therefore, only needs to determine whether a next commutation point has occurred. For example, referring to FIGS. 4 and 5, if the current preferred commutation state is AC (see FIG. 5), the next commutation point will occur when the relative inductance corresponding to state AC first surpasses the relative inductance corresponding to state CB (see FIG. 4). Thus, relative inductance measurements should be made for states AC and CB. However, in another approach, the commutation point can be considered to have occurred when the relative inductance value for state AC exceeds a predetermined threshold level (e.g., 600 a/d) that can be determined, for example, based upon the data of FIG. 4. Thus, at a minimum, only a single relative inductance measurement is necessary to detect the next commutation point.

To sample the rotor position during rotor acceleration requires a temporary suspension of the application of drive current to the motor coils 30, 32, 34. Once suspended, the controller 42 instructs the signal generator 44 to apply a test signal to the relevant windings of the motor and instructs the relative inductance measurement unit 46 to measure the relative inductance of the windings. The relative inductance information is delivered to the commutation state determination unit 50 which analyzes the relative inductance(s) to determine whether an ideal commutation point has been reached. If the analysis indicates that the commutation point has been reached, the commutation state determination unit 50 instructs the signal generator 44 to change to a next state in the predetermined state sequence. The controller 42 continues to perform the rotor position sampling until a determination is made to switch over to a back EMF based commutation method.

In accordance with the present invention, the sampling interval used by the controller 42 to sample the rotor position during rotor acceleration decreases with time as the rotor accelerates. The sampling interval can be decreased in any of a number of different ways. For example, the sampling interval can be reduced during the spin up process based on the changing angular velocity or position of the rotor. In another approach, the sampling interval can be determined as a function of time measured, for example, from the instant that a spin current is first applied to the motor 36. In a preferred embodiment, a predetermined sequence of sampling interval values are defined for the motor 36. The controller 42 switches between these predefined sampling intervals during the spin up process based on the changing commutation state of the motor 36. That is, each time a commutation point is detected by the commutation state determination unit 50, the controller 42 changes the sampling interval being used to sample the rotor position to a next lower value. Thus, a sampling interval is used during the spin up process that loosely follows the increase in rotational speed of the rotor.

Figure 6:
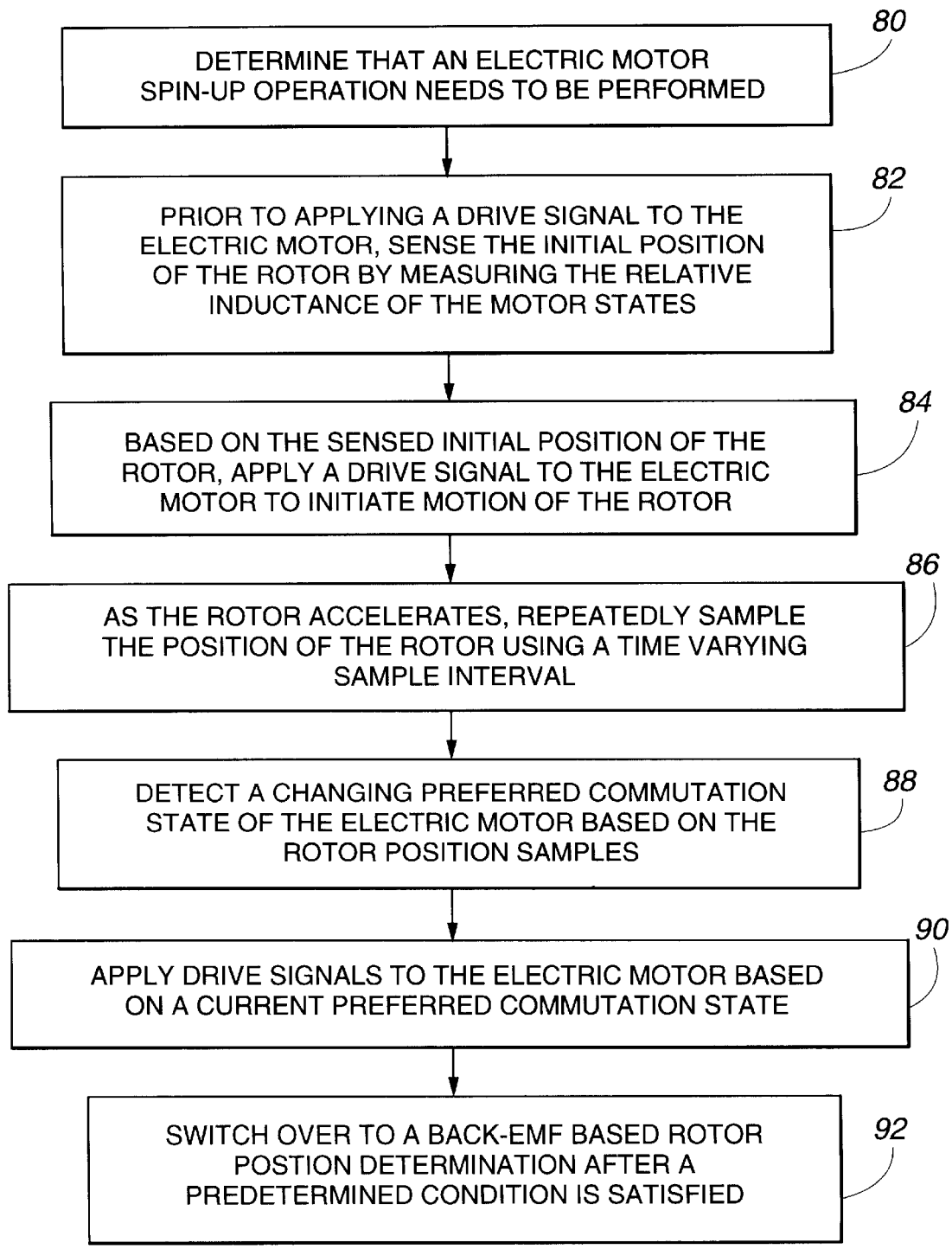
FIG. 6 is a flowchart illustrating a method for performing a spin up operation for an electric motor in accordance with one embodiment of the present invention.

FIG. 6 is a flowchart illustrating a method for performing an electric motor spin-up operation in accordance with one embodiment of the present invention. First, a determination is made that a spindle motor spin-up procedure needs to be performed (step 80). Prior to applying a drive signal to the electric motor (i.e., a signal intended to impart motion to the motor), the initial position of the rotor is sensed by measuring a relative inductance of each of the motor states (step 82). Based on the initial position of the rotor, a drive signal is applied to the electric motor to initiate motion of the rotor (step 84). Preferably, the signal that is applied is chosen to achieve a maximum torque within the motor. As the rotor accelerates, the position of the rotor is repeatedly sampled using a time varying sample interval (step 86). In a preferred approach, the sample interval is decreased as the rotor accelerates. The changing preferred commutation state of the electric motor is tracked using the rotor position samples (step 88) and drive signals are applied to the electric motor based thereon (step 90). In an optional step, the system eventually switches over to a back-EMF based rotor position determination method after a predetermined condition is satisfied (step 92). For example, in one embodiment, the method switches over to a back-EMF based method after a predetermined rotational velocity has been reached (typically about 4% of the nominal operating speed of the motor).

Figure 7:
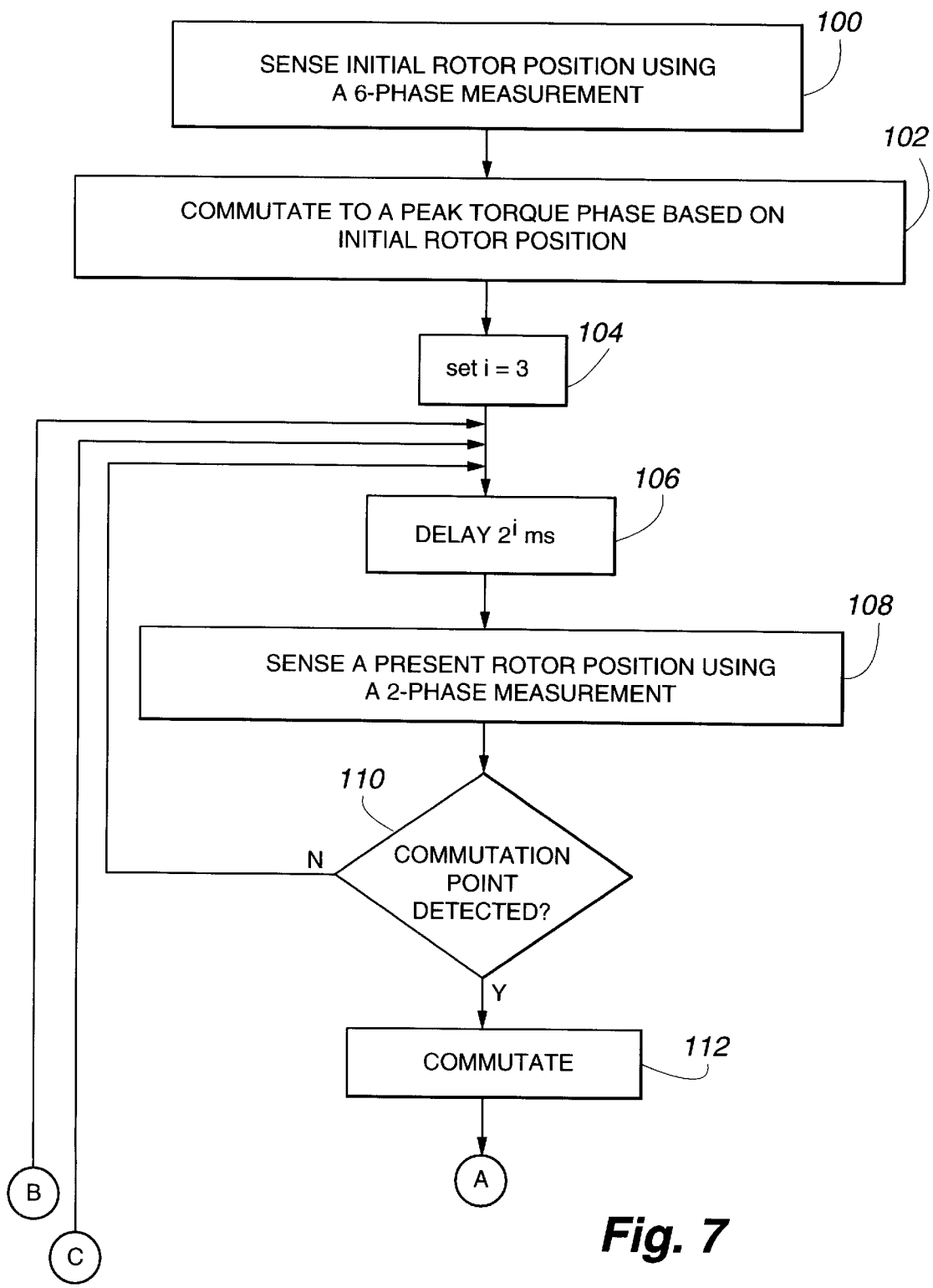
FIGS. 7 and 8 are portions of a flowchart illustrating a more detailed method for performing a spin up operation for an electric motor in accordance with one embodiment of the present invention.
Figure 8:
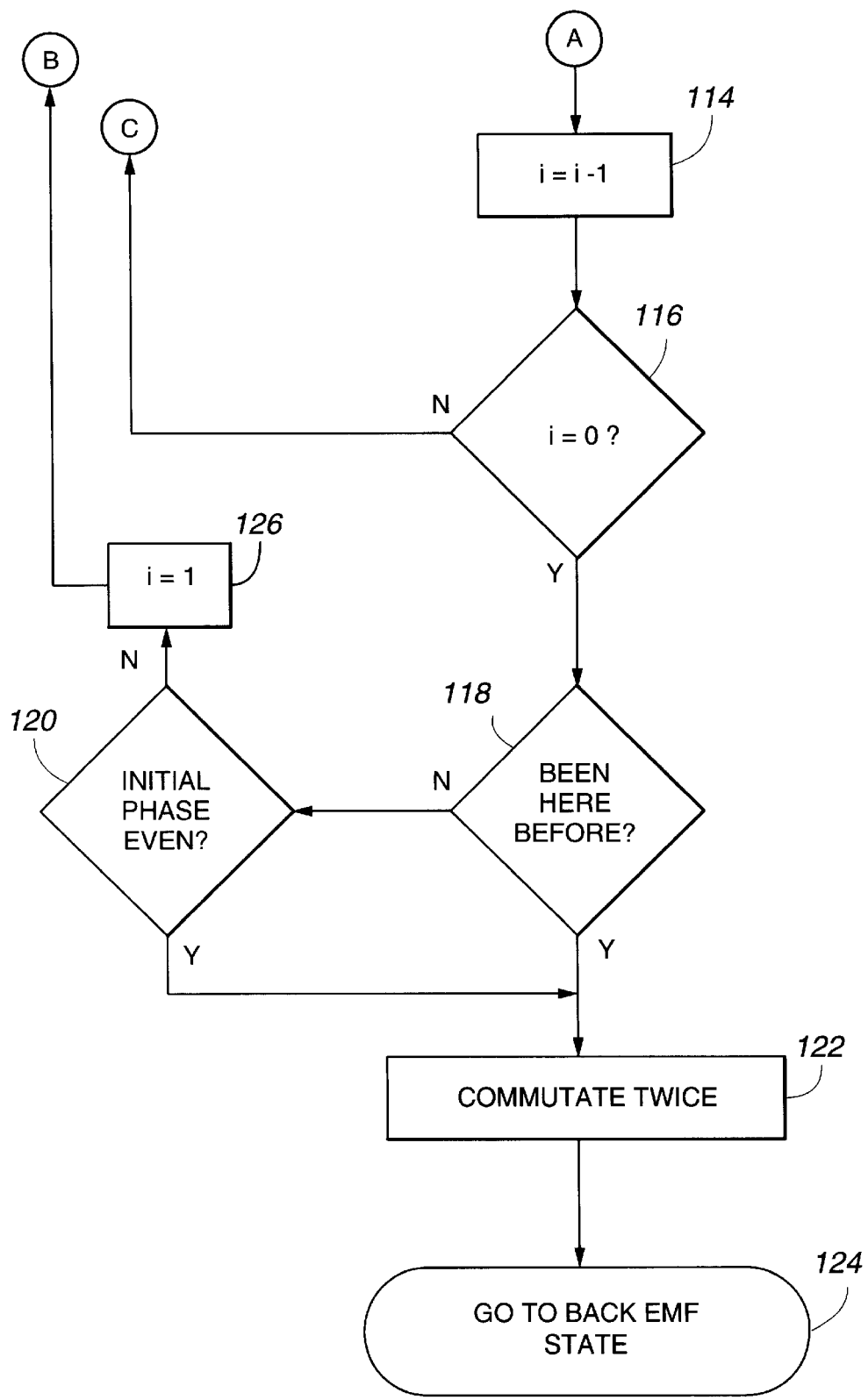

FIGS. 7 and 8 are portions of a flowchart illustrating a more detailed method for performing a spin-up operation within an electric motor in accordance with one embodiment of the present invention. As is described in greater detail below, the method illustrated in FIGS. 7 and 8 starts out with a predetermined rotor position sampling interval and then reduces that initial rotor position sampling interval by one-half each time a motor commutation point is detected. In the illustrated embodiment, for example, the initial sampling interval is equal to eight milliseconds. The sampling interval is then changed to four milliseconds and then to two milliseconds after detection of the next two commutation points. If the initial state of the motor was odd, the method then repeats the rotor position sampling using the two millisecond sampling interval again. The method eventually switches over to a back-EMF based feedback approach after the spin-up procedure has run its course. It should be appreciated, that the individual sampling interval values and the number of iterations that are used during the spin up procedure can be varied in any particular implementation.

With reference to FIG. 7, after a spin up decision has been made, the initial rotor position of the motor is sensed using a 6-state relative inductance measurement (step 100). The motor is then commutated to a peak torque state based on the initial rotor position (step 102). An index i is then initialized to a value (e.g., three in the illustrated embodiment) that represents the desired number of commutation points that will be detected before the method switches over to a back EMF based feedback approach (step 104). The method then waits for a sampling interval equal to $2^i=8$ milliseconds (step 106). At the end of the sampling interval, the current rotor position is sampled using a 2-state relative inductance measurement (step 108). The two states that are analyzed are determined based upon knowledge of the initial rotor position (or the initial preferred commutation state). For example, referring to FIGS. 4 and 5, if the initial preferred (i.e., peak torque) commutation state is AC, then the next commutation point occurs when the relative inductance of state AC first exceeds the relative inductance of state CB. Thus, only states AC and CB need be measured for relative inductance. In one approach, the system first commutates four states ahead to measure the inductance of state CB and then advances two more states (back to the original state) to measure the relative inductance of state AC. It is next determined whether an ideal commutation point has occurred (step 110). If the results indicate that a commutation point has occurred (e.g., if the relative inductance of state AC>the relative inductance of state CB in the above example), the system advances to a subsequent state (e.g., from state AC to state BC in the above example)(step 112). If a commutation point has not occurred, the method repeats steps 106 and 108 using an 8 millisecond sampling interval until a commutation point is detected.

The index i is next reduced by one to i=2 (step 114). The method then checks to see if the index has reached a value of zero (step 116). Because the index has not yet reached zero, the method returns to step 106 and waits for a sampling interval equal to $2^i=4$ milliseconds. The present rotor position is then sensed using another 2-state measurement (step 108). Thus, the previous detection of the commutation point has resulted in a change in the rotor position sampling interval. The method then repeats steps 106 and 108 using the 4 millisecond sampling interval until a next commutation point has been detected (step 110). The method then commutates the motor (step 112) and reduces the index i by 1 (step 114).

Eventually, the index i is reduced to zero and the answer to decision step 116 is yes. The method then determines whether the present point in the method has been reached before (step 118). Because this point in the procedure has not previously been reached, the method next determines whether the initial state of the motor was an even state (step 120). If the initial state was even, the method commutates the motor twice (step 122) and then proceeds to a sampling method based on back-EMF (step 124). The method commutates the motor twice to ensure that a first valid zero crossing is successfully detected.

If the initial motor state was odd, the method sets the index i back to 1 (step 126) and repeats steps 106 and 108 using a delay of 2 milliseconds until a next commutation point is detected. This additional sampling routine is performed based on the random location of the rotor at startup due to a feature in the driver circuitry. When a next commutation point is detected, the method again commutates the motor (step 112) and the index i is again reduced to zero (step 114). Because this is the second time the method has reached step 118, the method proceeds directly to step 122 and the motor is commutated twice. The method then changes to a sampling method based on back EMF (step 124).

FIGS. 9–24 are waveform diagrams illustrating typical waveforms that are generated during a spin up procedure in one embodiment of the present invention. Each of the diagrams illustrate three separate waveforms including a digital trace (ZCROSS) showing zero-crossing activity on top, a waveform representing the motor current ($I_{spin}$) in the middle, and a digital trace that shows (when expanded) each advancement or commutation of the motor on the bottom.

Figure 9:
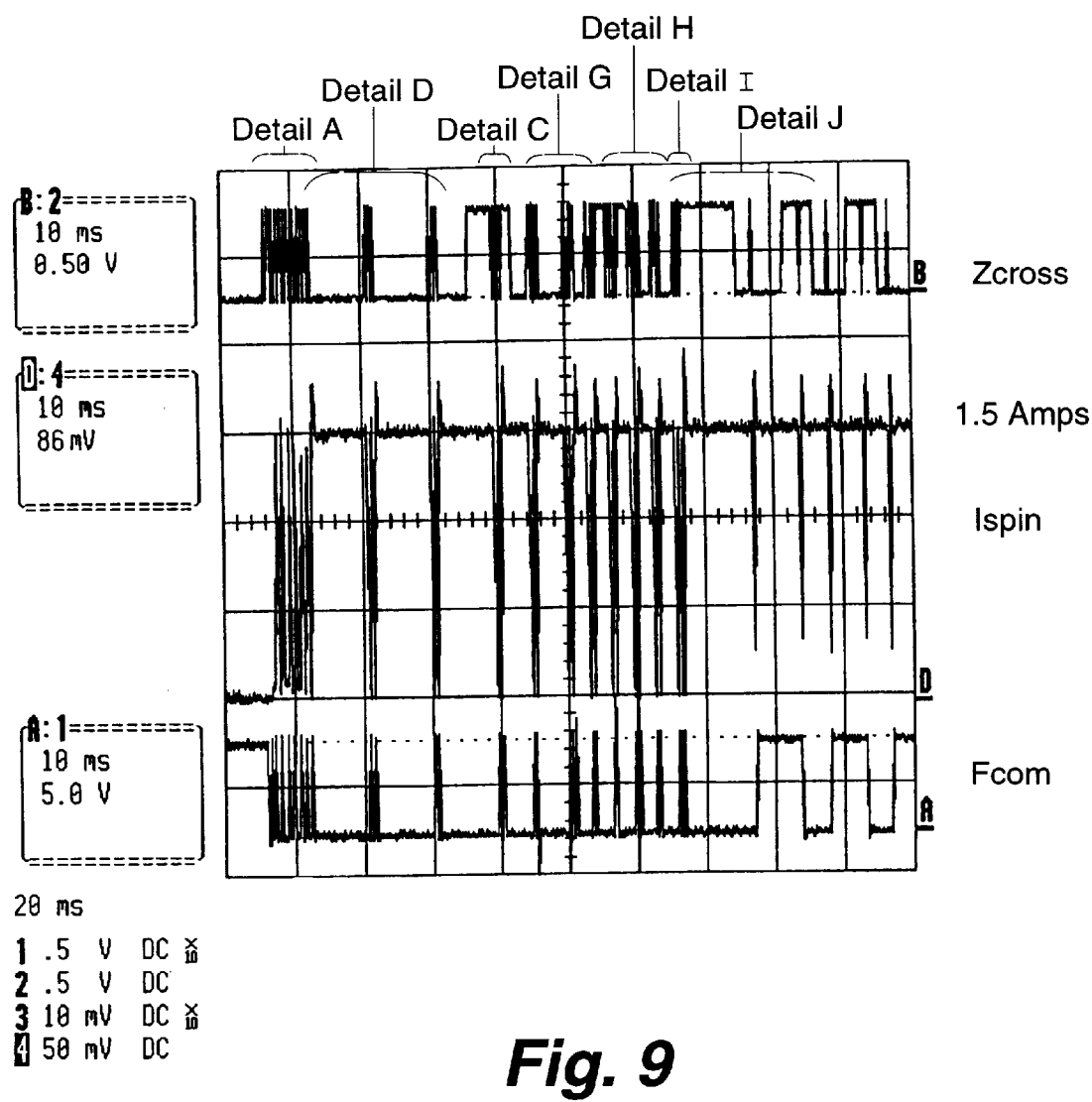
FIGS. 9–24 are waveform diagrams illustrating typical waveforms that are generated within a disk drive during a spindle motor spin up procedure in accordance with one embodiment of the present invention.
Figure 10:
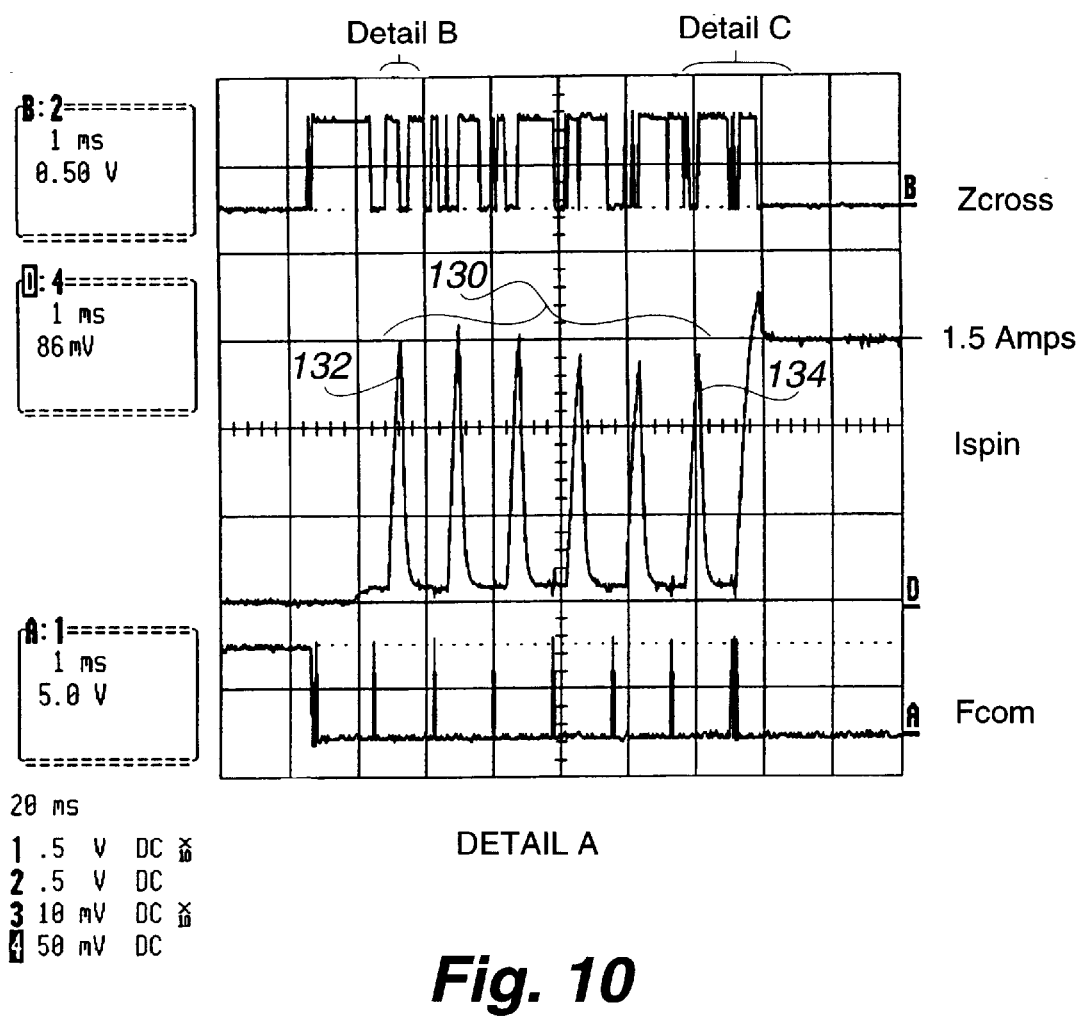
Figure 11:
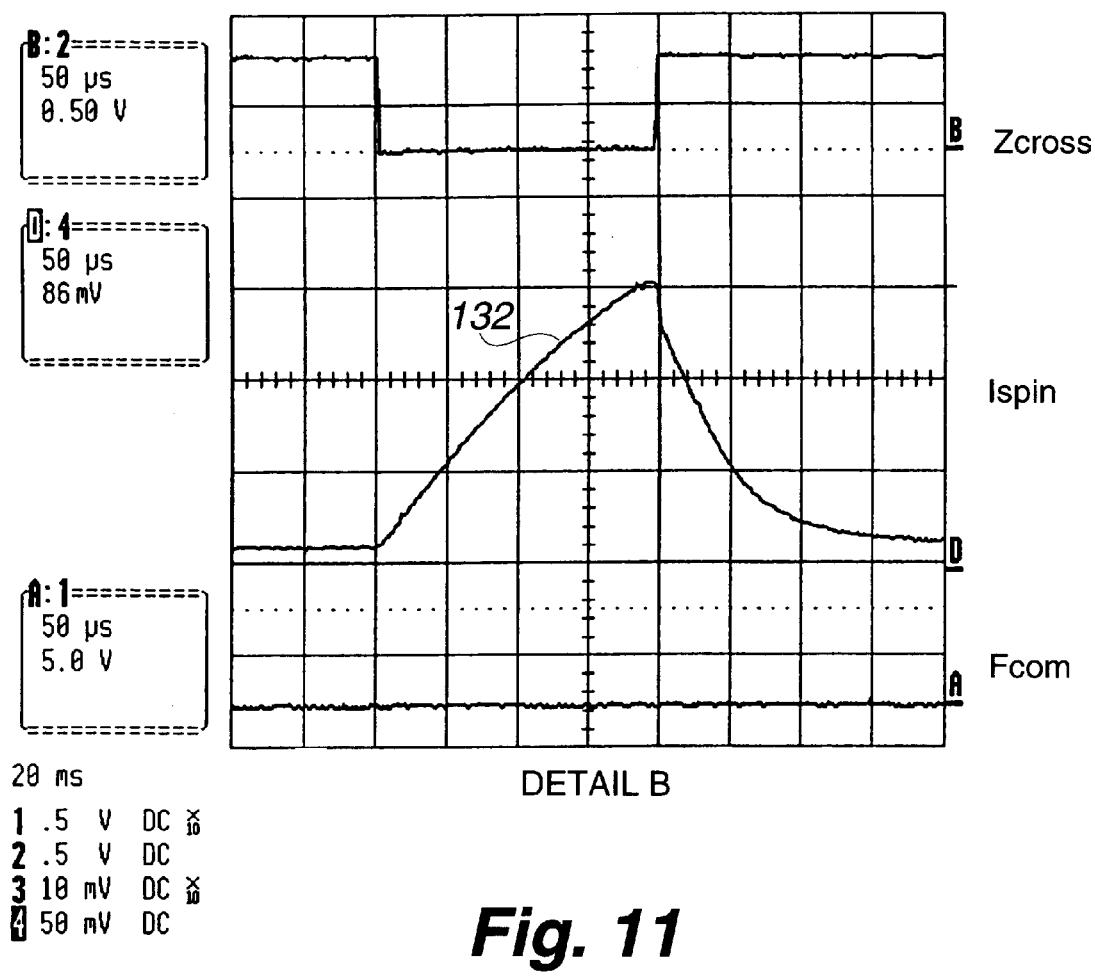
Figure 12:
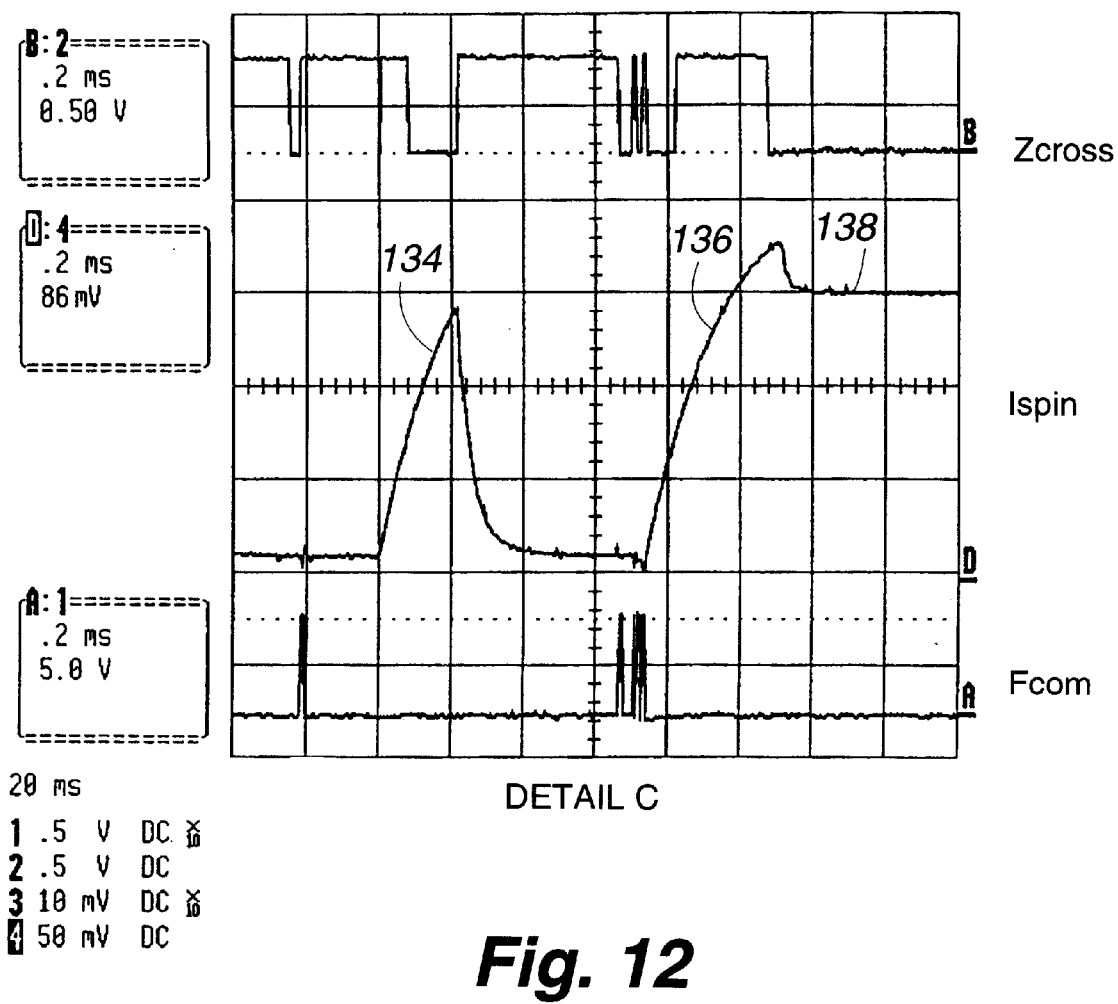

FIG. 9 is a waveform diagram illustrating the entire spin up cycle for a disk drive having a single disk. FIG. 10 is an enlarged view of detail A of FIG. 9 showing the 6-state position sensing sequence 130. Each of the 6 individual peaks in the motor current waveform ($I_{spin}$) of FIG. 10 is an individual current rise for a corresponding state of the motor. FIG. 11 is an enlarged view of detail B of FIG. 10 illustrating a current rise 132 associated with a first motor state. A relative inductance associated with the first motor state is determined by sampling the current rise waveform 132 at a point 150 microseconds after the current rise 132 begins (i.e., at the center axis in FIG. 11). FIG. 12 is an enlarged view of detail C of FIG. 10 illustrating the last current rise 134 in the 6-state sequence followed by a transition 136 to a full drive current state 138. The full drive current state 138 represents the peak torque state of the motor.

Figure 13:
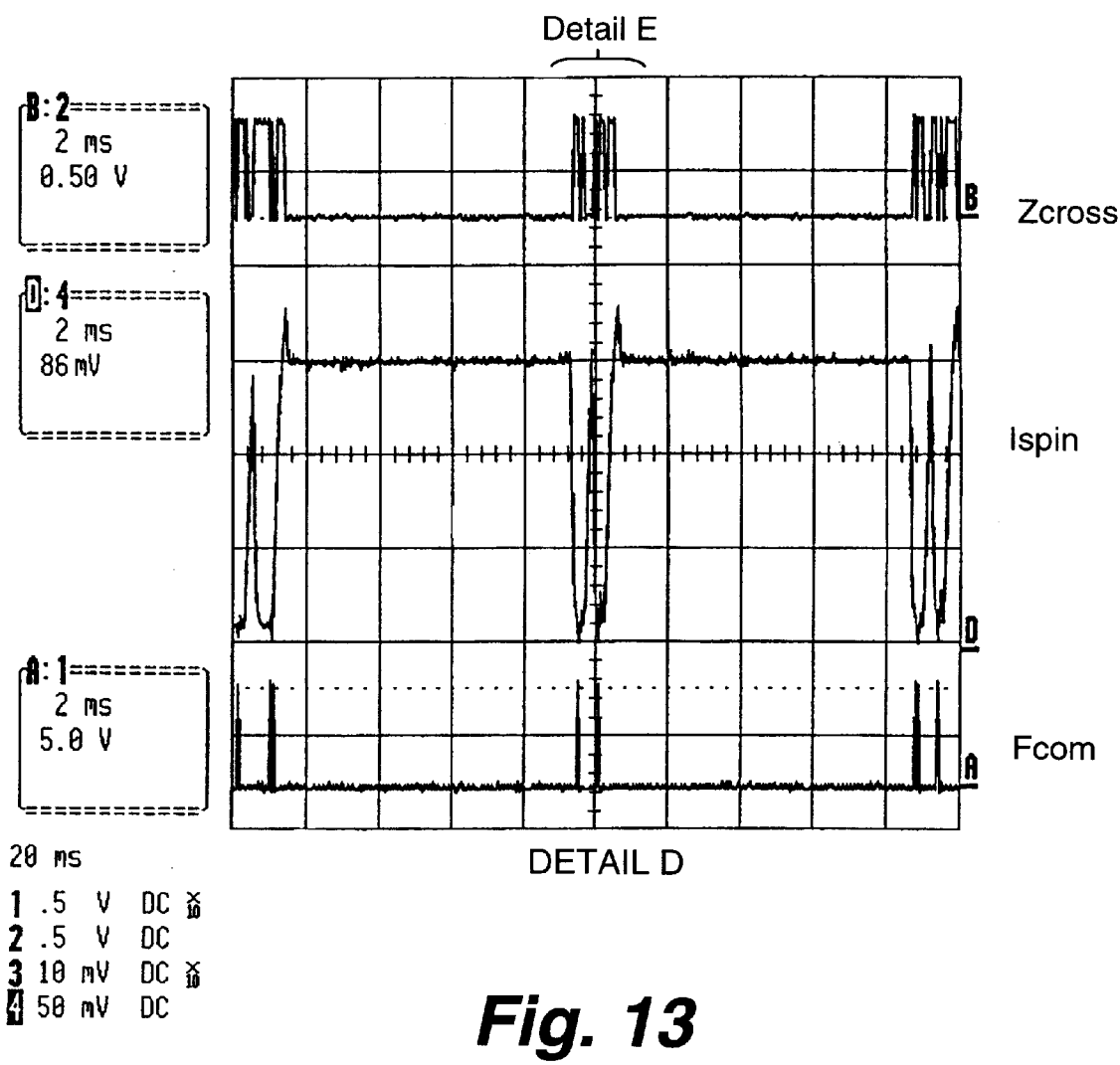
Figure 14:
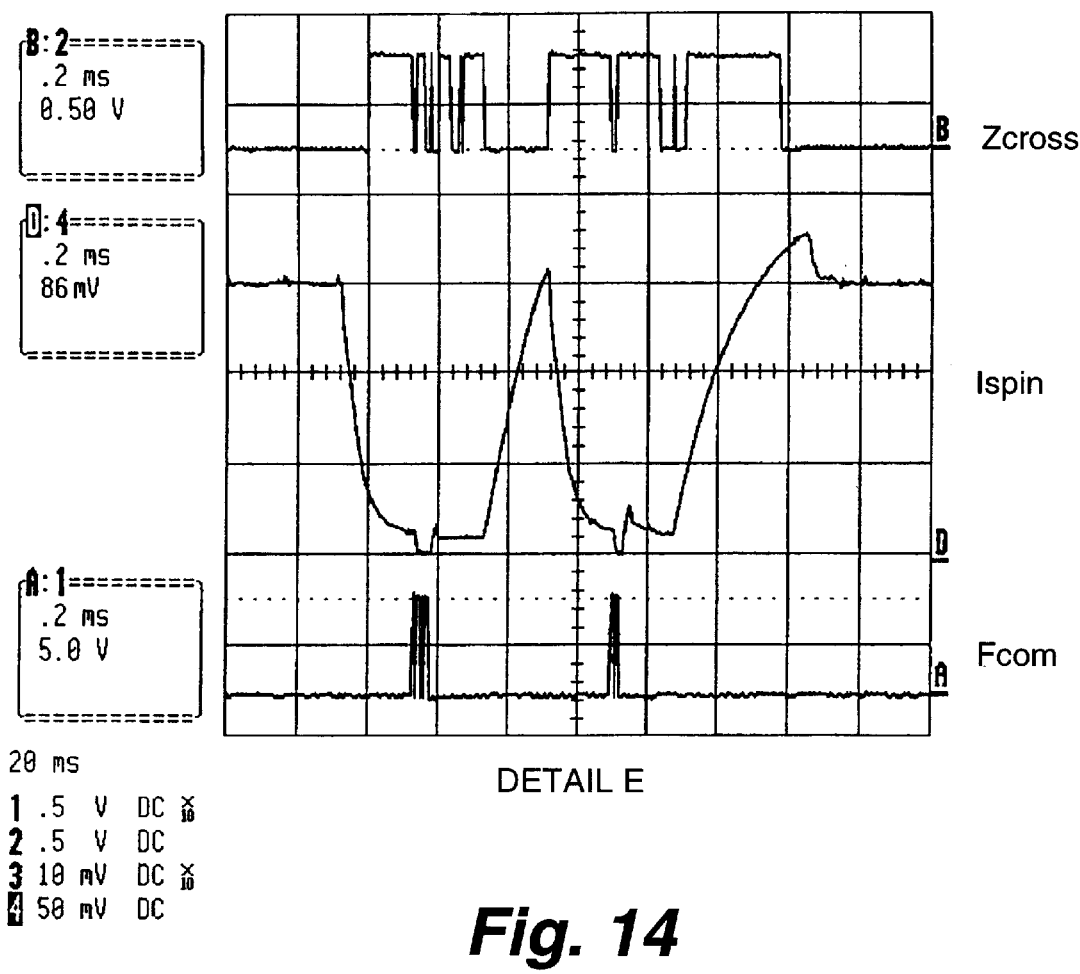
Figure 15:
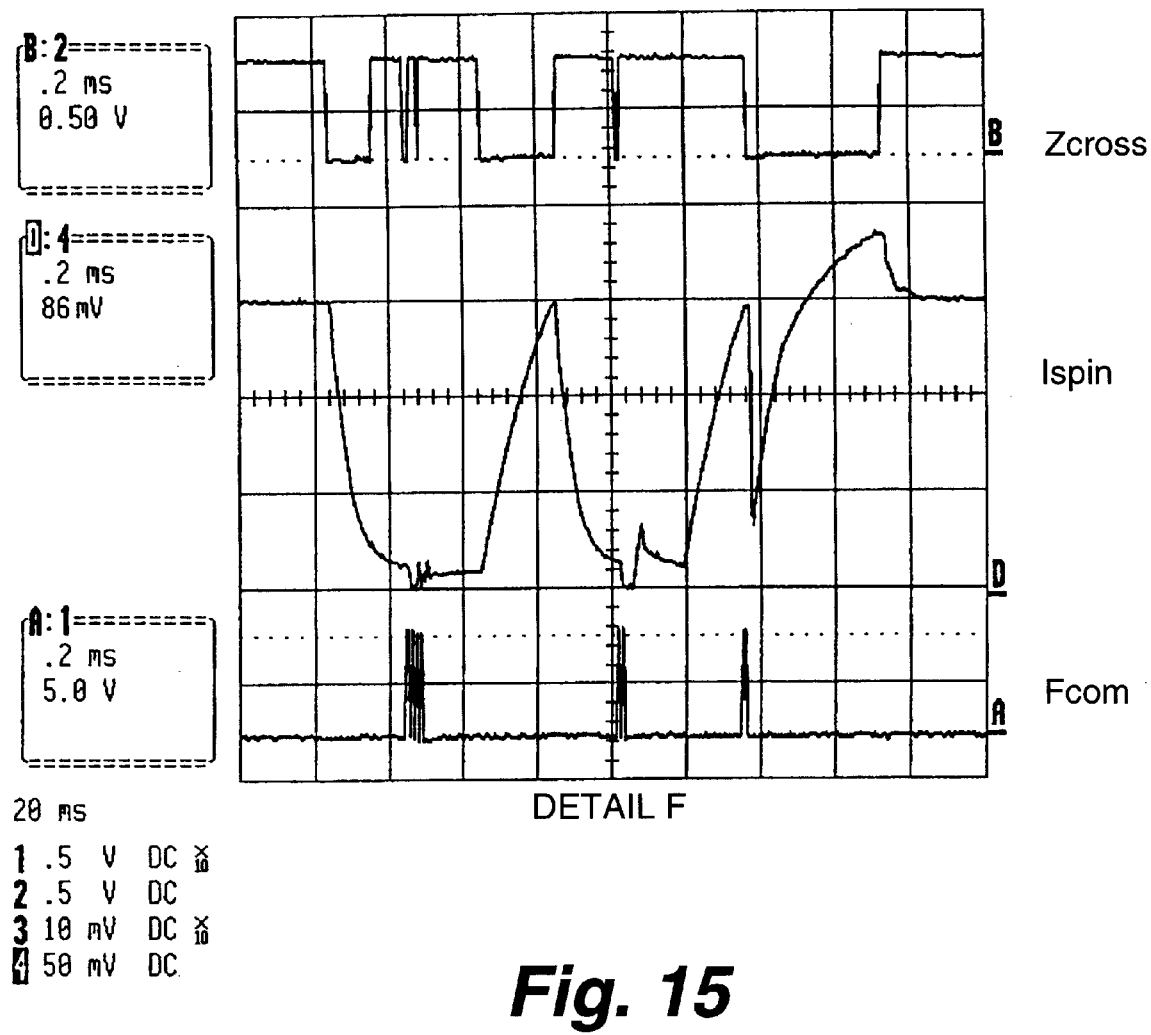
Figure 16:
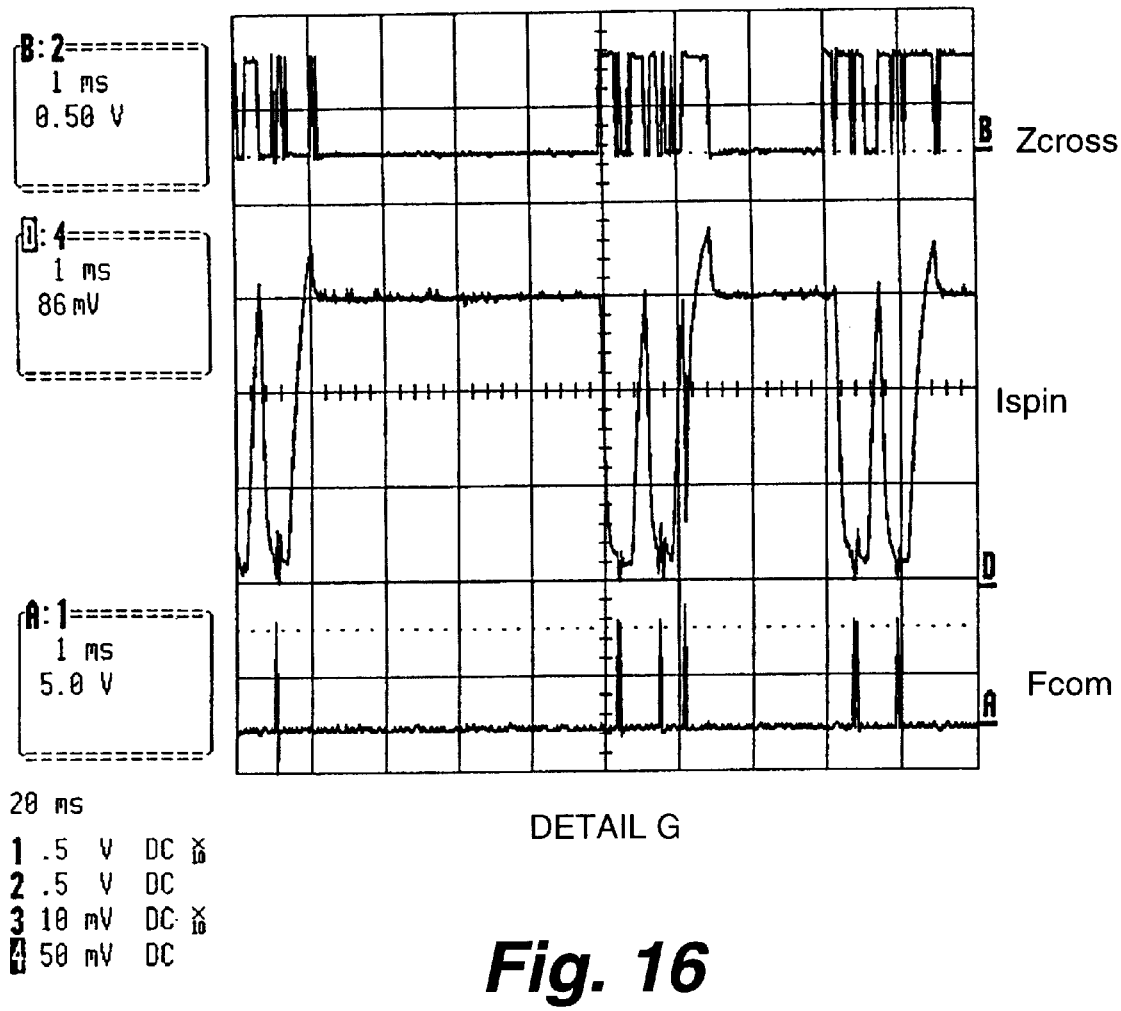

FIG. 13 is an enlarged view of detail D of FIG. 9 illustrating the first two samples in the first commutation state of the motor. Note that the two samples each occur after an 8 millisecond delay interval. FIG. 14 is an enlarged view of detail E of FIG. 13 illustrating a typical 2-state sample sequence in the first commutation state with no advance. FIG. 15 is an enlarged view of detail F of FIG. 9 illustrating the last 2-state sample sequence of the first commutation state. During the sequence, the ideal commutation switchpoint is detected and the motor is advanced from the first commutation state to a subsequent (i.e., second) commutation state. FIG. 16 is an enlarged view of detail G of FIG. 9 illustrating the last 2-state sample sequence of the second commutation state illustrating the advancement to the third commutation state. Note the change from a 4 millisecond sampling interval to a 2 millisecond sampling interval.

Figure 17:
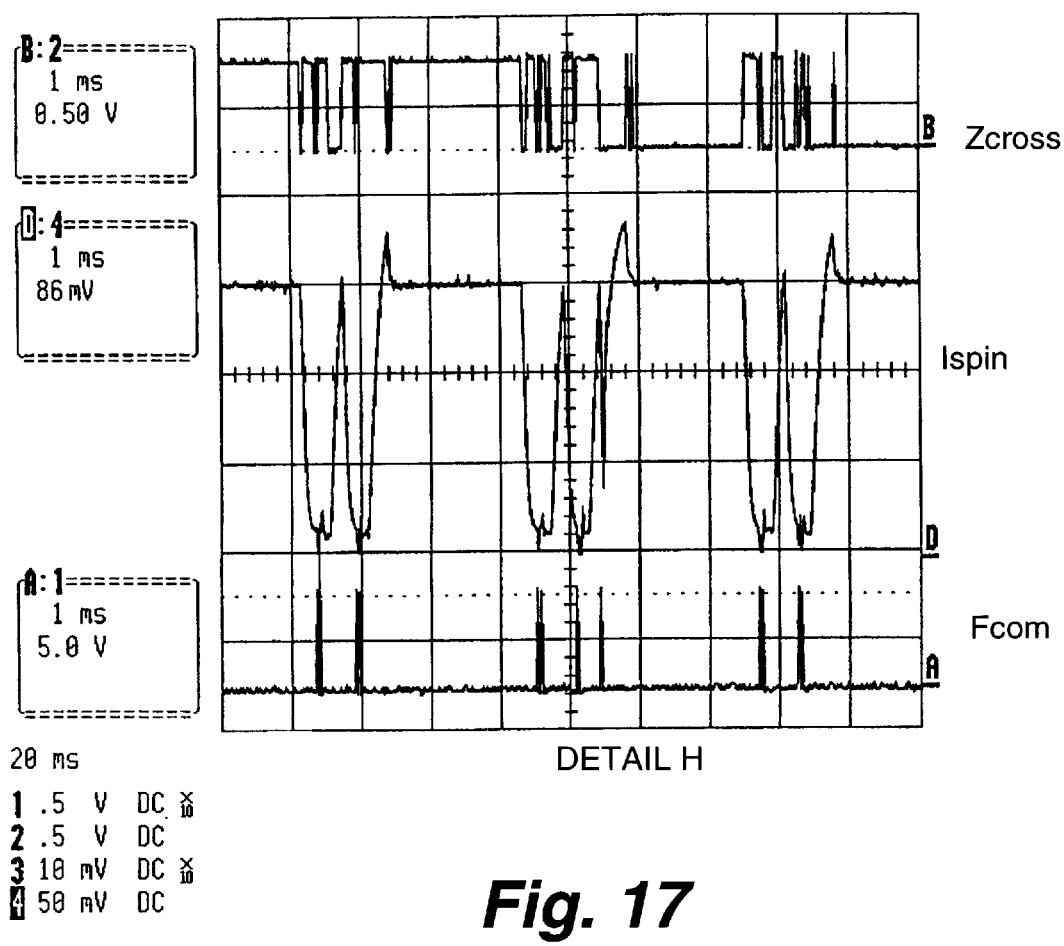
Figure 18:
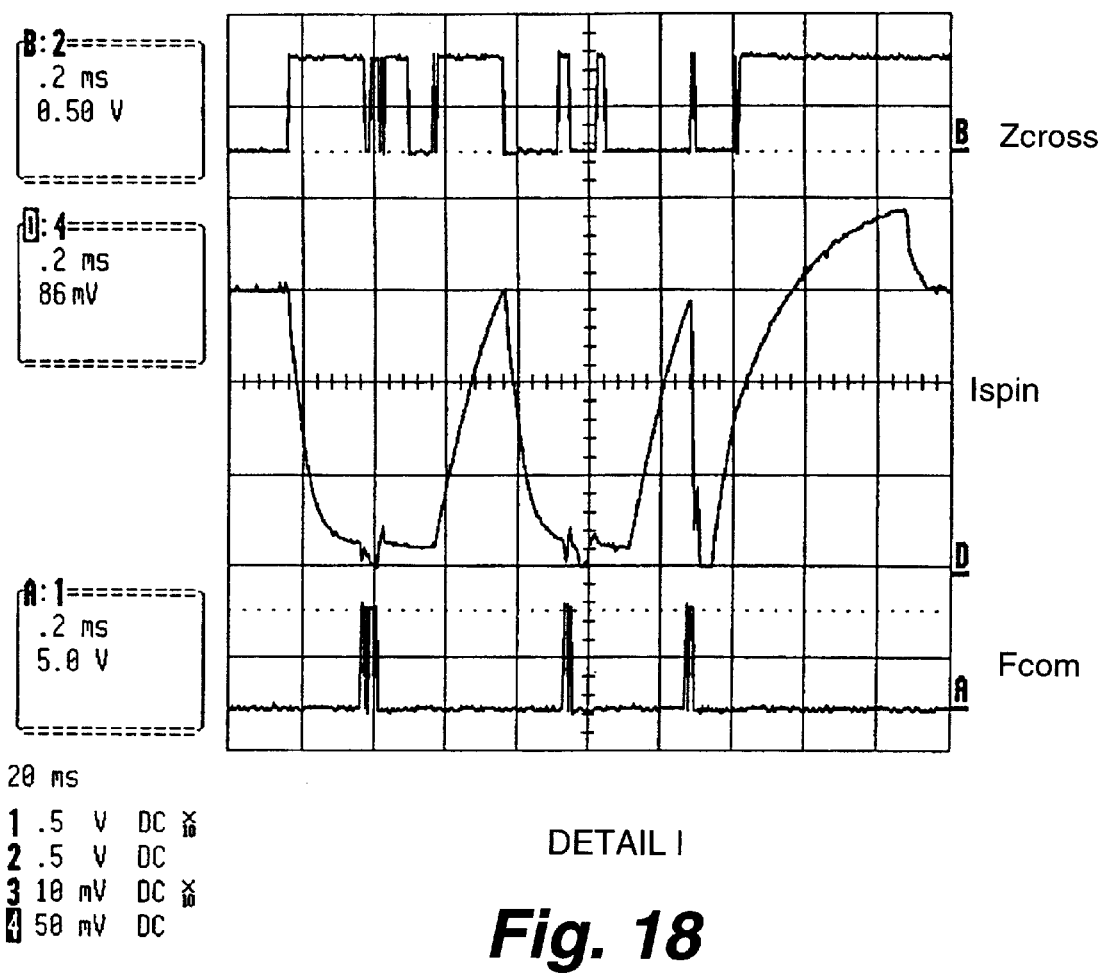
Figure 19:
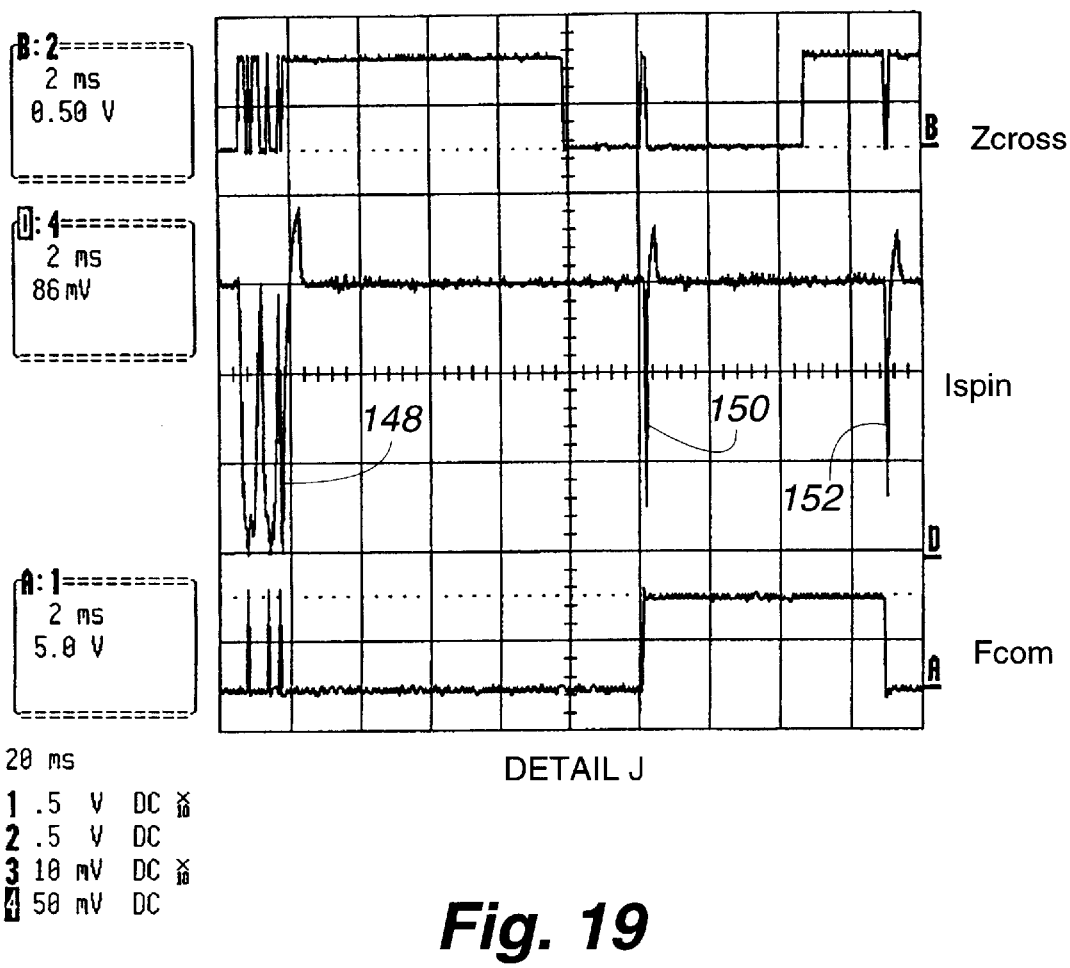

FIG. 17 is an enlarged view of detail H of FIG. 9 illustrating the transition from the third commutation state to the fourth commutation state necessitated by the existence of an odd start state. Note that the 2 millisecond sampling interval is repeated for the fourth commutation state. FIG. 18 is enlarged view of detail I of FIG. 9 illustrating the transition from the fourth commutation state to the back EMF driven state. After the ideal switchpoint is detected, the motor is advanced 2 commutation states to ensure that the first valid zero cross is successfully detected. FIG. 19 is an enlarged view of detail J of FIG. 9 illustrating the end of the spin up sequence 148 followed by the first 2 zero cross detected, edge driven commutations 150, 152.

Figure 20:
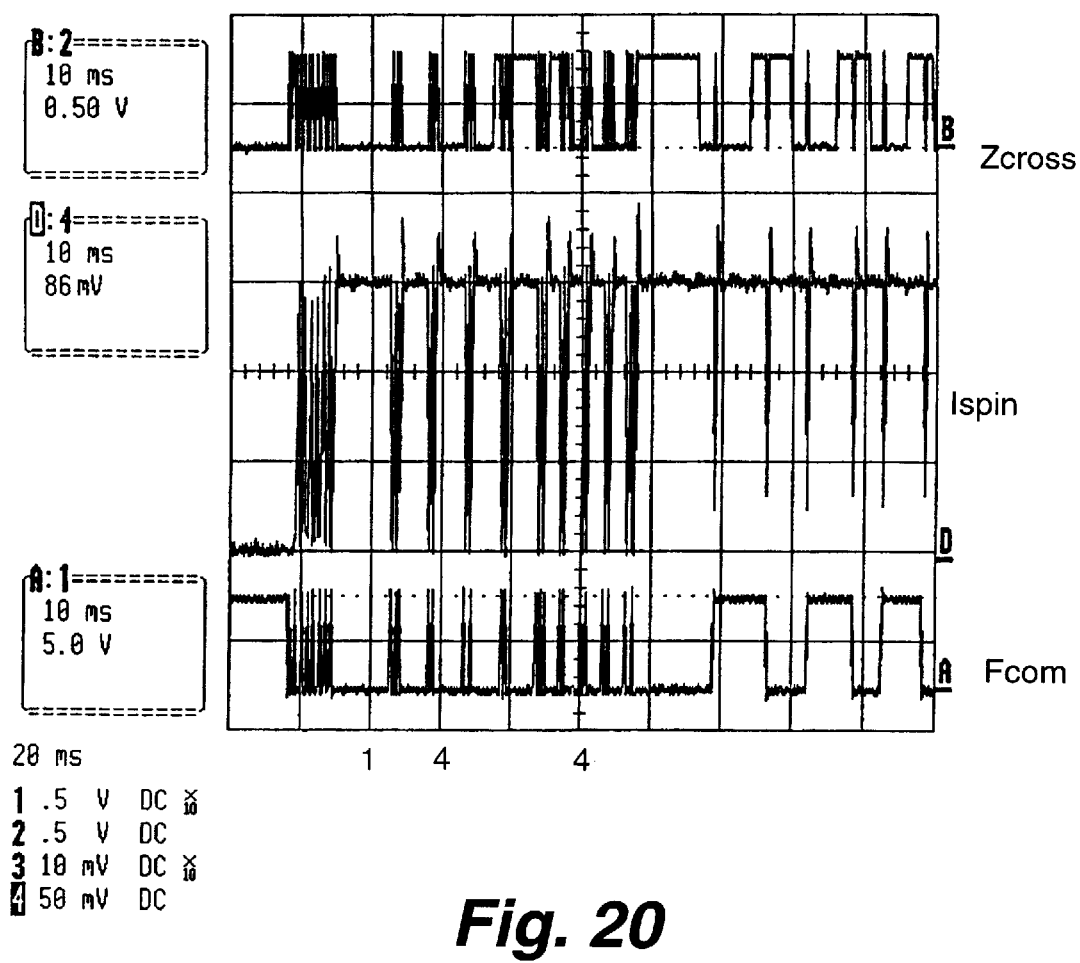
Figure 21:
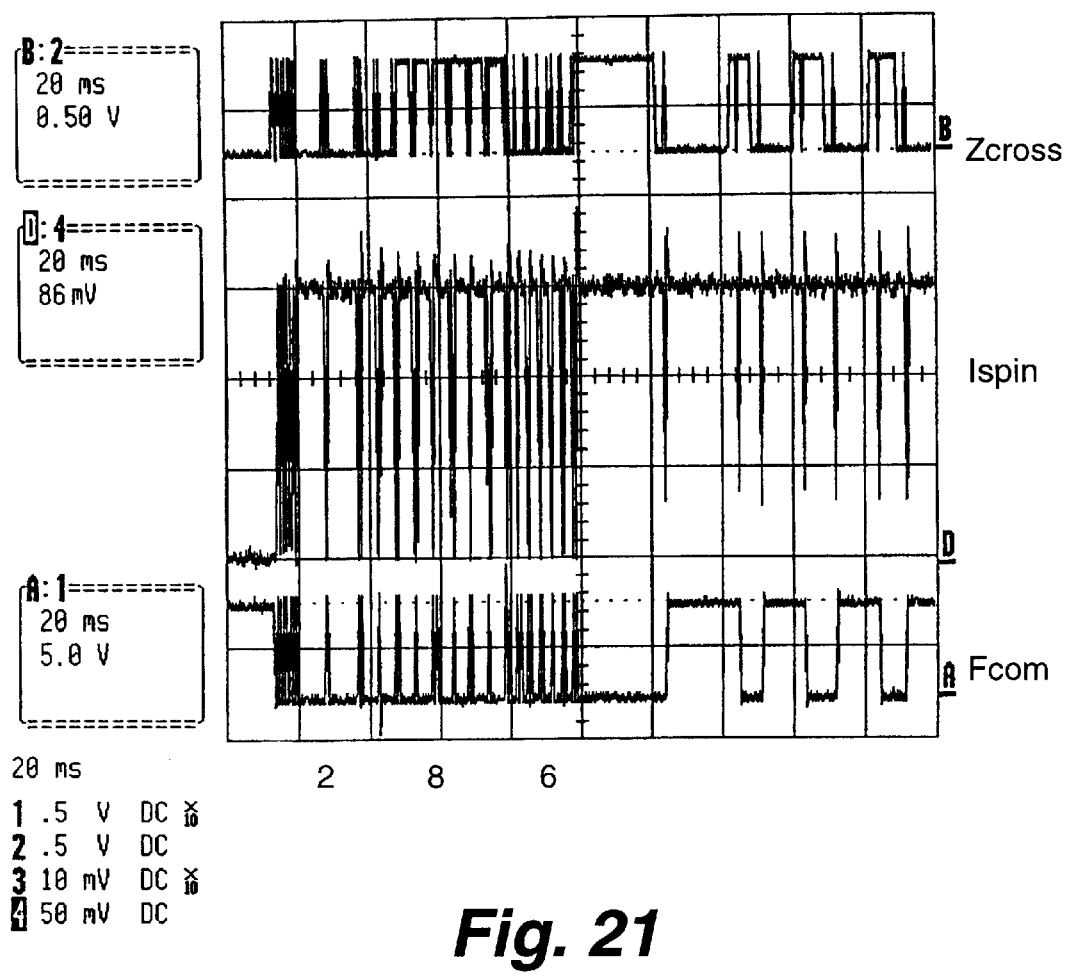
Figure 22:
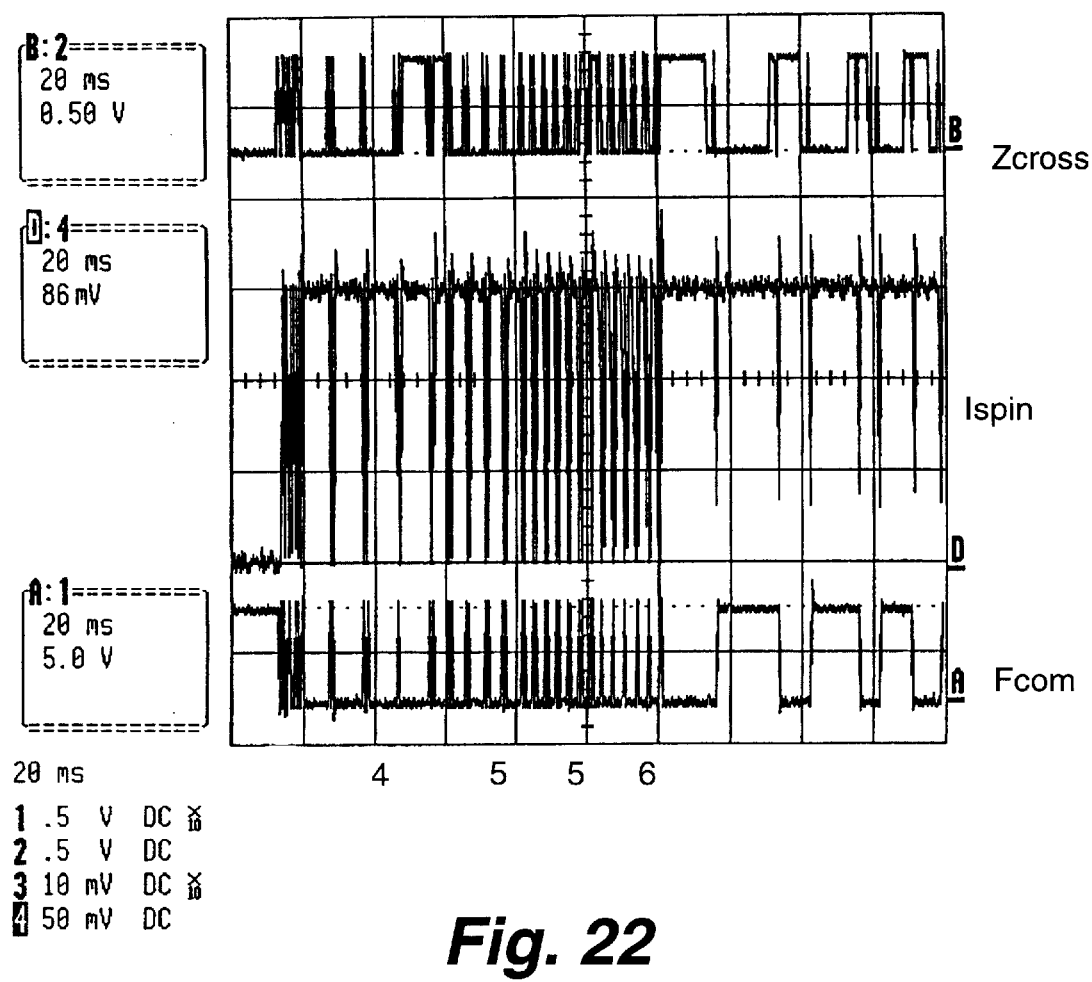
Figure 23:
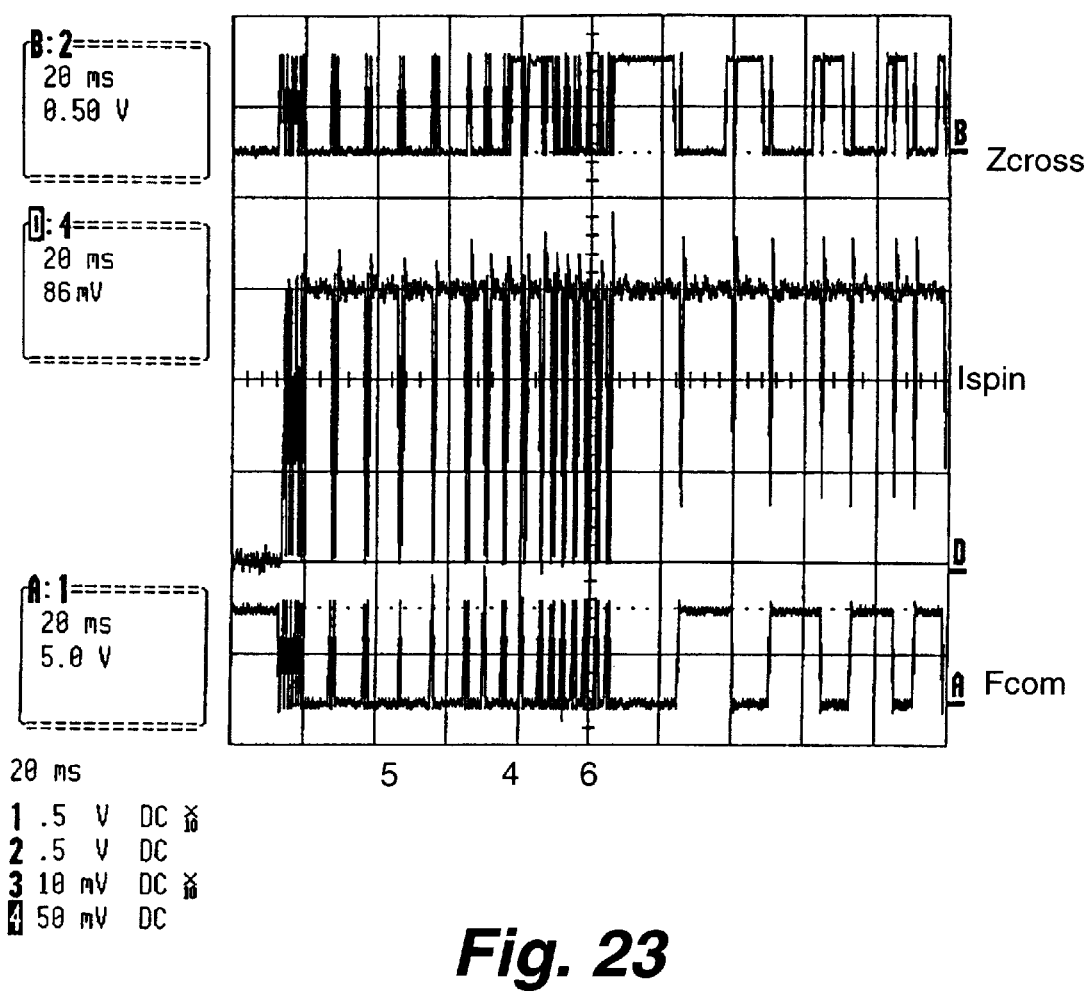
Figure 24:
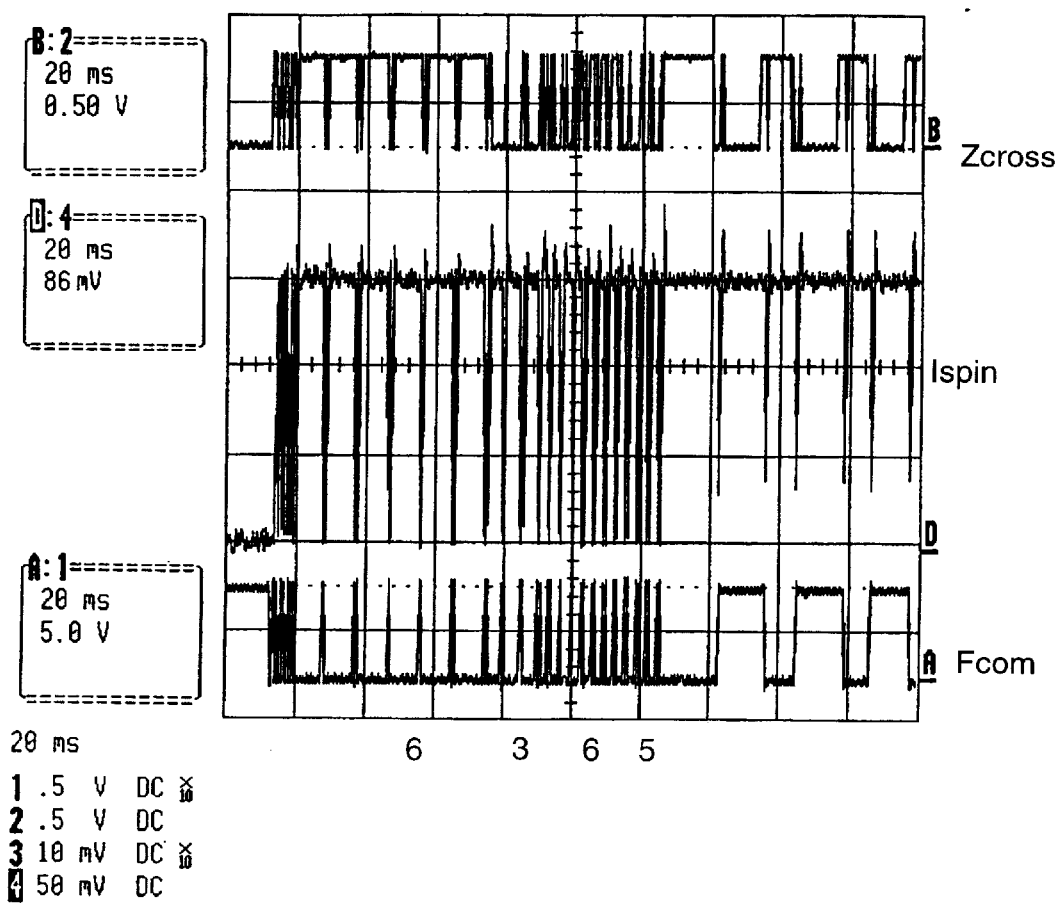

FIG. 20 is a waveform diagram illustrating the entire spin up cycle for a disk drive having a single disk when there is an even start state. Note that only three different commutation states are used before the system changes to a back EMF driven state. FIG. 21 is a waveform diagram illustrating the entire spin up cycle for a disk drive having 4 individual disks. Note that a larger number of samples are taken for each commutation state. This is because the disk hub having four disks has a larger mass and thus accelerates more slowly. FIG. 22 is a waveform diagram illustrating a spin up cycle for the disk drive having four disks when there is an odd start state. Thus, an additional commutation state (using a two millisecond sampling interval) is used during the spin up cycle. FIGS. 23 and 24 are waveform diagrams illustrating two additional spin up cycles for the disk drive having four disks.

Although the present invention has been described in conjunction with its preferred embodiments, it is to be understood that modifications and variations may be resorted to without departing from the spirit and scope of the invention as those skilled in the art readily understand. For example, the inventive principles can be used in connection with motors having a number of different internal configurations and are not limited to use with the motor configurations disclosed herein. Such modifications and variations are considered to be within the purview and scope of the invention and the appended claims.

What is claimed is:

1. A method for use in spinning up an electric motor having a rotor, a stator, and a plurality of coils, comprising the steps of:

applying a signal to said plurality of coils to initiate rotation of said rotor with respect to said stator;

repeatedly sampling parameters related to a position of said rotor with respect to said stator using a sampling interval that decreases over time as said rotor accelerates; and applying additional signals to said plurality of coils as said rotor accelerates based on position sample information generated in said step of repeatedly sampling.

2. The method, as claimed in claim 1, wherein:

said step of repeatedly sampling includes decreasing said sampling interval based on an advancing commutation state of said electric motor.

3. The method, as claimed in claim 2, wherein:

said step of repeatedly sampling includes changing to a next lower sampling interval value in a predetermined sequence of sampling interval values when a new commutation state is detected.

4. The method, as claimed in claim 1, wherein:

said step of repeatedly sampling includes decreasing said sampling interval in approximate inverse proportion to a rotational velocity of said rotor.

5. The method, as claimed in claim 1, wherein:

said step of repeatedly sampling includes decreasing said sampling interval based on a present position of said rotor with respect to said stator.

6. The method, as claimed in claim 1, wherein:

said step of repeatedly sampling includes decreasing said sampling interval based on an elapsed time from an instant when said signal is applied to said plurality of coils in said step of applying a signal.

7. The method, as claimed in claim 1, wherein:

said step of applying additional signals includes tracking a present commutation state of said electric motor using said position sample information and applying signals to said plurality of coils based thereon.

8. The method, as claimed in claim 1, wherein:

said step of repeatedly sampling includes measuring an inductance of at least one state of said electric motor.

9. The method, as claimed in claim 1, further comprising:

determining an initial position of said rotor with respect to said stator before said step of applying a signal.

10. The method, as claimed in claim 9, wherein:

said step of applying a signal includes determining a maximum torque commutation state of said electric motor based on said initial position and applying said maximum torque commutation state to said plurality of coils.

11. The method, as claimed in claim 9, wherein:

said step of determining an initial position includes measuring a relative inductance of different states of said electric motor and determining said initial position based thereon.

12. An apparatus for use in spinning up an electric motor from an immobile state, said electric motor having a rotor, a stator, and a plurality of coils, said apparatus comprising:

a signal source for generating signals to be applied to said plurality of coils to impart motion to said rotor, said signal source generating said signals in response to a commutation signal that is indicative of a changing commutation state of said electric motor;

a rotor position sampling unit for repeatedly sampling parameters related to rotor position as said rotor accelerates from a stationary position, said rotor position sampling unit using a sampling interval that decreases as said rotor accelerates; and a commutation unit for detecting commutation points of said motor based on said rotor position samples, said commutation unit generating said commutation signal.

13. The apparatus, as claimed in claim 12, wherein:

said rotor position sampling unit includes a relative inductance measurement unit for measuring a relative inductance of different states of said electric motor.

14. The apparatus, as claimed in claim 13, wherein:

said relative inductance measurement unit measures a relative inductance of at least two different motor states each sampling interval.

15. The apparatus, as claimed in claim 13, wherein:

said relative inductance measurement unit measures a relative inductance of a first motor state by determining a level to which a current has risen within the first motor state a predetermined amount of time after a signal is applied to the first motor state.

16. An apparatus for use in commutating an electric motor during a motor start up period, said electric motor having a stator, a rotor, and a plurality of coils, said apparatus comprising:

means for initiating acceleration of the rotor from a stationary position;

means for sampling a parameter related to rotor position as said rotor accelerates to generate a plurality of samples;

means for changing a sampling interval used by said means for sampling as said rotor accelerates; and means for tracking a changing commutation state of said electric motor based on said plurality of samples.

17. The apparatus, as claimed in claim 16, wherein:

said means for changing a sampling interval changes said sampling interval when said means for tracking detects a new commutation state.

18. The apparatus, as claimed in claim 16, wherein:

said means for changing a sampling interval changes said sampling interval based on a detected rotor velocity.

19. The apparatus, as claimed in claim 16, wherein:

said means for changing a sampling interval changes said sampling interval based on an elapsed time.

20. The apparatus, as claimed in claim 16, wherein:

said means for sampling includes means for determining a relative inductance of a state of said electric motor.

21. The apparatus, as claimed in claim 20, wherein:

said means for determining a relative inductance includes means for measuring a current within said state of said electric motor a predetermined period of time after application of a signal to said state.

22. A method for use in spinning up an electric motor from a stationary state, said electric motor having a rotor and a stator, comprising the steps of:

determining an initial position of said rotor with respect to said stator;

applying a signal to coils of said electric motor based on said initial position to initiate acceleration of said rotor;

repeatedly sampling parameters related to rotor position as said rotor accelerates to generate a plurality of sample values;

tracking a changing commutation state of said motor using said plurality of sample values; and changing a sampling interval used in said step of repeatedly sampling in response to detection of a new commutation state in said step of tracking a changing commutation state.

23. The method, as claimed in claim 22, wherein:

said step of changing a sampling interval includes changing to a next sampling interval value in a predetermined sequence of sampling interval values when a new commutation state is detected.

24. The method, as claimed in claim 23, wherein:

said predetermined sequence of sampling interval values includes a geometrically decreasing sequence of values.

25. The method, as claimed in claim 22, wherein:

said step of repeatedly sampling includes repeatedly measuring relative inductance levels of coil states of said electric motor.

26. The method, as claimed in claim 22, further comprising the step of:

tracking a changing commutation state of said electric motor based on back EMF signals induced in said coils of said electric motor after a predetermined condition is satisfied.

* * * * *